(12) United States Patent
Olson

(10) Patent No.: US 11,629,816 B2
(45) Date of Patent: Apr. 18, 2023

(54) ADJUSTABLE STAND FOR SUPPORTING OBJECTS ON THE ADJUSTABLE STAND

(71) Applicant: Lorin P. Olson, Scotts Valley, CA (US)

(72) Inventor: Lorin P. Olson, Scotts Valley, CA (US)

(*) Notice: Subject to any disclaimer, the term of this patent is extended or adjusted under 35 U.S.C. 154(b) by 0 days.

(21) Appl. No.: 17/939,916

(22) Filed: Sep. 7, 2022

(65) Prior Publication Data

US 2023/0076389 A1 Mar. 9, 2023

Related U.S. Application Data

(60) Provisional application No. 63/241,470, filed on Sep. 7, 2021.

(51) Int. Cl.
| | |
|---|---|
| *F16M 11/10* | (2006.01) |
| *A47B 23/04* | (2006.01) |
| *F16M 13/04* | (2006.01) |
| *F16M 11/20* | (2006.01) |

(52) U.S. Cl.
CPC ............ *F16M 13/04* (2013.01); *F16M 11/10* (2013.01); *F16M 11/2021* (2013.01); *A47B 23/043* (2013.01)

(58) Field of Classification Search
USPC ....... 248/130, 133, 132, 134, 136, 138, 139, 248/140, 142, 144, 149, 150, 371, 372.1, 248/393, 395, 397, 441.1, 444, 447, 448, 248/454, 455, 4, 56, 457, 458, 460, 462
See application file for complete search history.

(56) References Cited

U.S. PATENT DOCUMENTS

| | | | | |
|---|---|---|---|---|
| 4,318,471 | A | | 3/1982 | Hutton |
| 4,466,601 | A | * | 8/1984 | Raines .................. B23Q 1/525 269/294 |
| 4,624,433 | A | * | 11/1986 | Henneberg ............. F16M 11/10 248/346.06 |
| 5,355,811 | A | | 10/1994 | Brewer |
| 5,810,316 | A | | 9/1998 | Eby |
| 6,290,228 | B1 | | 9/2001 | Roberts |
| 6,679,468 | B1 | * | 1/2004 | Hsu ......................... A45C 9/00 248/456 |
| 7,597,302 | B2 | * | 10/2009 | Lee .................... F16M 11/2021 248/371 |
| 8,672,277 | B2 | * | 3/2014 | Hsu ........................ F16M 11/38 248/371 |

(Continued)

*Primary Examiner* — Alfred J Wujciak

(57) ABSTRACT

Disclosed herein is an adjustable stand for supporting objects on the adjustable stand, in accordance with some embodiments. Accordingly, the adjustable stand comprises a bottom plate, a middle plate, a top plate, a toggle mechanism, and an actuating device. The toggle mechanism allows pivoting of the top plate in an unlocked state and restricts the pivoting in the locked state. The actuating device transitions the toggle mechanism to the unlocked state by receiving a first actuating input and transitions the toggle mechanism to the locked state by receiving a second actuating input. The toggle mechanism transitions to the unlocked state from the locked state based on applying a pivoting force on the top plate above a threshold pivoting force without receiving the first actuating input. The toggle mechanism transitions to the locked state from the unlocked state based on releasing the pivoting force applied to the top plate.

19 Claims, 33 Drawing Sheets

(56) References Cited

U.S. PATENT DOCUMENTS

| | | | |
|---|---|---|---|
| 8,770,536 B2 * | 7/2014 | Hu ................... | G01R 31/2808 |
| | | | 248/452 |
| 2021/0353051 A1 * | 11/2021 | Phifer ................ | F16M 13/00 |

* cited by examiner

ADJUSTABLE STAND FOR SUPPORTING OBJECTS ON THE ADJUSTABLE STAND

FIELD OF THE INVENTION

Generally, the present disclosure relates to the field of material or article handling equipment. More specifically, the present disclosure relates to an adjustable stand for supporting objects on the adjustable stand.

BACKGROUND OF THE INVENTION

Existing stands are deficient with regard to several aspects. For instance, current stands are designed to be specifically placed on a stable surface while operating them. As a result, different stands are needed which can be placed on non stable surfaces while operating them. Moreover, current stands are specifically designed to be placed on surfaces. As result, different stands are needed that can be secured to the surfaces. Furthermore, current stands are specifically designed to allow placing objects on them. As a result, different stands are needed that can secure the objects to them.

Another problem with existing stands is that many require the use of two hands to operate the stand, especially to change the level of the stand while holding other parts of the stand in place. The present invention may be easily operated with one hand by squeezing the handle and lifting up or pulling down on the handle.

Therefore, there is a need for an adjustable stand for supporting objects on the adjustable stand that may overcome one or more of the above-mentioned problems and/or limitations.

SUMMARY OF THE INVENTION

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

Disclosed herein is an adjustable stand for supporting objects on the adjustable stand, in accordance with some embodiments. Accordingly, the adjustable stand may include a bottom plate, a middle plate, a top plate, a toggle mechanism, and at least one actuating device. Further, the middle plate may be pivotably coupled to the bottom plate using a first coupling mechanism. Further, the middle plate pivots between a closed position and at least one open position in relation to the bottom plate about a first pivoting axis of the first coupling mechanism using the first coupling mechanism for adjusting a height of the adjustable stand. Further, the top plate may be pivotably coupled to the middle plate using a second coupling mechanism. Further, the top plate pivots between a plurality of positions in relation to the middle plate about a second pivoting axis of the second coupling mechanism using the second coupling mechanism for adjusting an orientation of the top plate in relation to the middle plate. Further, the toggle mechanism may be mounted on a bottom surface of the top plate. Further, the toggle mechanism may be operatably coupled with the second coupling mechanism. Further, the toggle mechanism may be transitionable between a locked state and an unlocked state. Further, the toggle mechanism allows pivoting of the top plate in the unlocked state and restricts the pivoting of the top plate in the locked state. Further, the at least one actuating device may be operatably coupled with the toggle mechanism. Further, the at least one actuating device may be configured for transitioning the toggle mechanism from the locked state to the unlocked state based on the receiving of a first actuating input. Further, the at least one actuating device may be configured for transitioning the toggle mechanism from the unlocked state to the locked state based on the receiving of a second actuating input. Further, the toggle mechanism may be configured for transitioning to the unlocked state from the locked state based on applying a pivoting force on the top plate above a threshold pivoting force without the receiving of the first actuating input. Further, the toggle mechanism may be configured for transitioning to the locked state from the unlocked state based on releasing the pivoting force applied to the top plate.

In some embodiments, the mechanism to facilitate movement between the top, middle and bottom plate does not necessarily make use of a toggle. Rather, the holding mechanism uses another type of leverage mechanism to control desire plate motion, to resist some weaker forces while allowing for movement of the plates when greater undesired force is applied that could damage the unit.

Further, disclosed herein is an adjustable stand for supporting objects on the adjustable stand, in accordance with some embodiments. Accordingly, the adjustable stand may include a bottom plate, a middle plate, a top plate, a toggle mechanism, and at least one actuating device. Further, the middle plate may be pivotably coupled to the bottom plate using a first coupling mechanism. Further, the middle plate pivots between a closed position and at least one open position in relation to the bottom plate about a first pivoting axis of the first coupling mechanism using the first coupling mechanism for adjusting a height of the adjustable stand. Further, the top plate may be pivotably coupled to the middle plate using a second coupling mechanism. Further, the top plate pivots between a plurality of positions in relation to the middle plate about a second pivoting axis of the second coupling mechanism using the second coupling mechanism for adjusting an orientation of the top plate in relation to the middle plate. Further, the toggle mechanism may be mounted on a bottom surface of the top plate. Further, the toggle mechanism may be operatably coupled with the second coupling mechanism. Further, the toggle mechanism may be transitionable between a locked state and an unlocked state. Further, the toggle mechanism allows pivoting of the top plate in the unlocked state and restricts the pivoting of the top plate in the locked state. Further, the at least one actuating device may be operatably coupled with the toggle mechanism. Further, the at least one actuating device may be configured for transitioning the toggle mechanism from the locked state to the unlocked state based on the receiving of a first actuating input. Further, the at least one actuating device may be configured for transitioning the toggle mechanism from the unlocked state to the locked state based on the receiving of a second actuating input. Further, the at least one actuating device may include a latch mechanism mounted on the bottom surface of the top plate. Further, the latch mechanism may be operatably coupled with the toggle mechanism. Further, the receiving of the first actuating input may include applying a pull force on a handle of the latch mechanism. Further, the receiving of the second actuating input may include releasing the pull force applied to the handle. Further, the toggle mechanism may be configured for transitioning to the unlocked state from the locked state based on applying a pivoting force on the top plate above a threshold pivoting force without the receiving of the first actuating input. Further, the toggle mechanism may be configured for transitioning to the locked state from the unlocked state based on releasing the pivoting force applied to the top plate.

Disclosed herein is an adjustable stand for supporting objects on the adjustable stand, in accordance with some embodiments. Accordingly, the adjustable stand may include a bottom plate, a middle plate, a top plate, a toggle mechanism, and at least one actuating device. Further, the middle plate may be pivotably coupled to the bottom plate using a first coupling mechanism. Further, the middle plate pivots between a closed position and at least one open position in relation to the bottom plate about a first pivoting axis of the first coupling mechanism using the first coupling mechanism for adjusting a height of the adjustable stand. Further, the top plate may be pivotably coupled to the middle plate using a second coupling mechanism. Further, the top plate pivots between a plurality of positions in relation to the middle plate about a second pivoting axis of the second coupling mechanism using the second coupling mechanism for adjusting an orientation of the top plate in relation to the middle plate. Further, the toggle mechanism may be mounted on a bottom surface of the top plate. Further, the toggle mechanism may be operatably coupled with the second coupling mechanism. Further, the toggle mechanism may be transitionable between a locked state and an unlocked state. Further, the toggle mechanism allows pivoting of the top plate in the unlocked state and restricts pivoting of the top plate in the locked state. Further, the at least one actuating device may be operatably coupled with the toggle mechanism. Further, the at least one actuating device may be configured for transitioning the toggle mechanism from the locked state to the unlocked state based on the receiving of a first actuating input. Further, the at least one actuating device may be configured for transitioning the toggle mechanism from the unlocked state to the locked state based on the receiving of a second actuating input. Further, the at least one actuating device may include an electrically actuated solenoid. Further, the receiving of the first actuating input may include receiving a first actuating action from at least one input device coupled to the electrically actuated solenoid. Further, the receiving of the second actuating input may include receiving a second actuating action from the at least one input device. Further, the toggle mechanism may be configured for transitioning to the unlocked state from the locked state based on applying a pivoting force on the top plate above a threshold pivoting force without the receiving of the first actuating input. Further, the toggle mechanism may be configured for transitioning to the locked state from the unlocked state based on releasing the pivoting force applied to the top plate.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and subcombinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

DETAILED DESCRIPTION OF THE INVENTION

Figure 1:
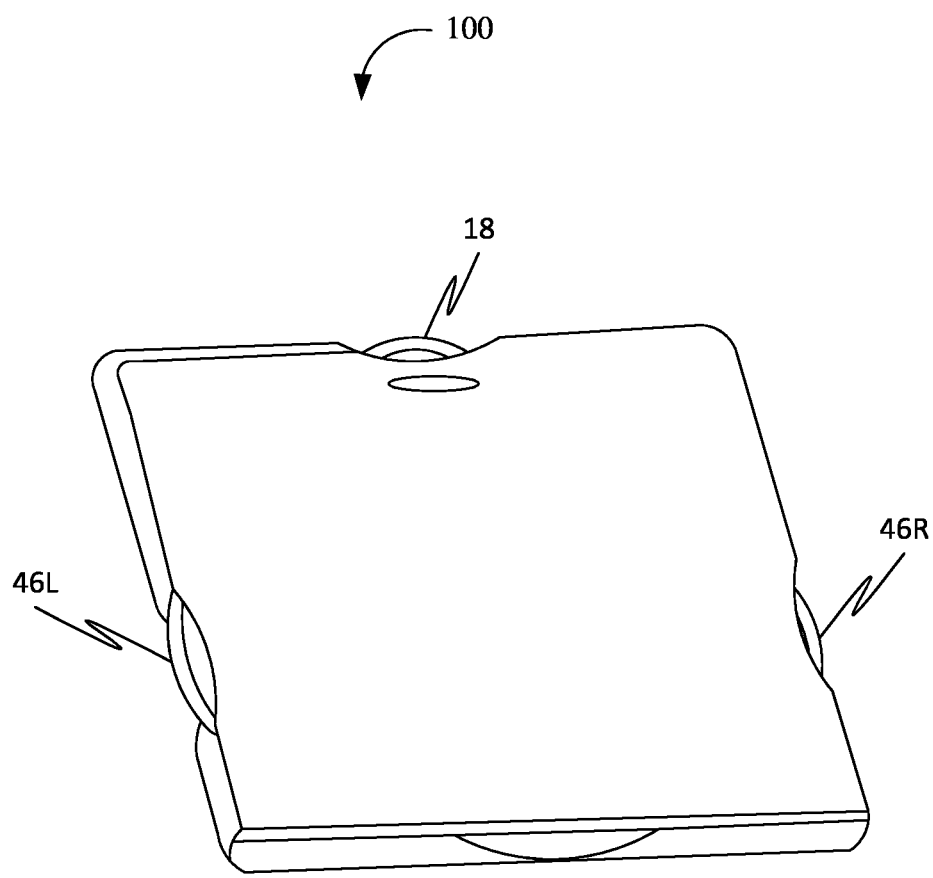
FIG. 1 is a top perspective view of a portable adjustable stand in a retracted configuration, in accordance with some embodiments.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of an adjustable stand for supporting objects on the adjustable stand, embodiments of the present disclosure are not limited to use only in this context.

Overview:

The present disclosure describes an adjustable stand for supporting objects on the adjustable stand. Further, the adjustable stand may be a portable adjustable book stand that can be used anywhere.

Further, the adjustable stand relates generally to a portable, adjustable stand. More specifically, an adjustable stand with a small light weight hand carried mechanism and a top surface used to support items such as but not limited to objects such as books, documents, tv dinners, or laptop computers for personal use or display.

Further, the adjustable stand is small, lightweight, portable, and attractive. In its retracted configuration, it can easily be held in one hand and carried with books similar in size. The clamps on the legs hold it on a tilted lap leaving the hands free. It can be adjusted from a retracted configuration to a user position using one hand, either left or right. The upper surface can be tilted forward or back to suit any user position. It can be easily carried and used in a variety of places where seating is close as at stadiums, lectures, classrooms, busses, airplanes, cars, home, etc. The size and weight make it convenient for a standing person to use by hanging it from a strap around the neck. Further, the strap may be a conventional neck strap comprised of flexible material.

FIG. 1 is a top perspective view of a portable adjustable stand 100 in a retracted configuration, in accordance with some embodiments.

Figure 2:
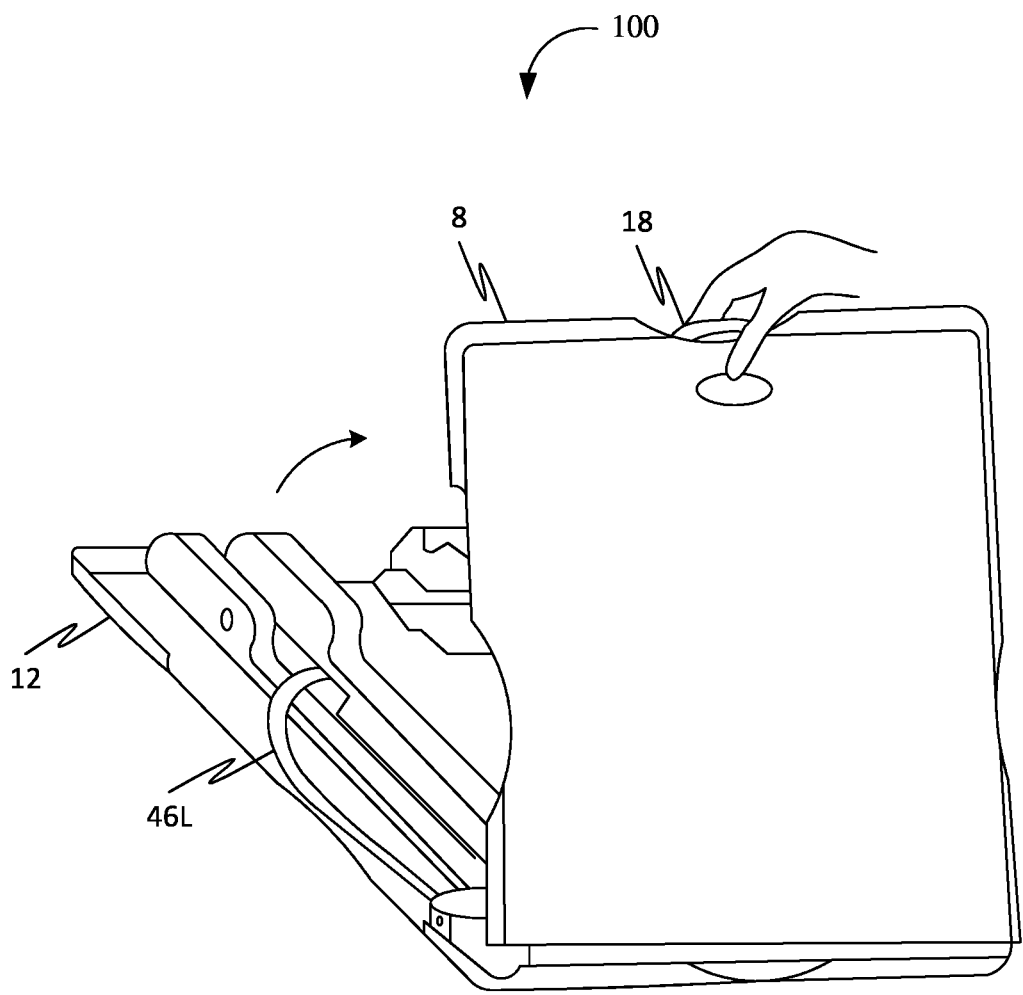
FIG. 2 is a front perspective view of the portable adjustable stand with a top plate and a middle plate of the portable adjustable stand raised, in accordance with some embodiments.

FIG. 2 is a front perspective view of the portable adjustable stand 100 with a top plate 8 and a middle plate 10 of the portable adjustable stand 100 raised, in accordance with some embodiments.

Figure 3:
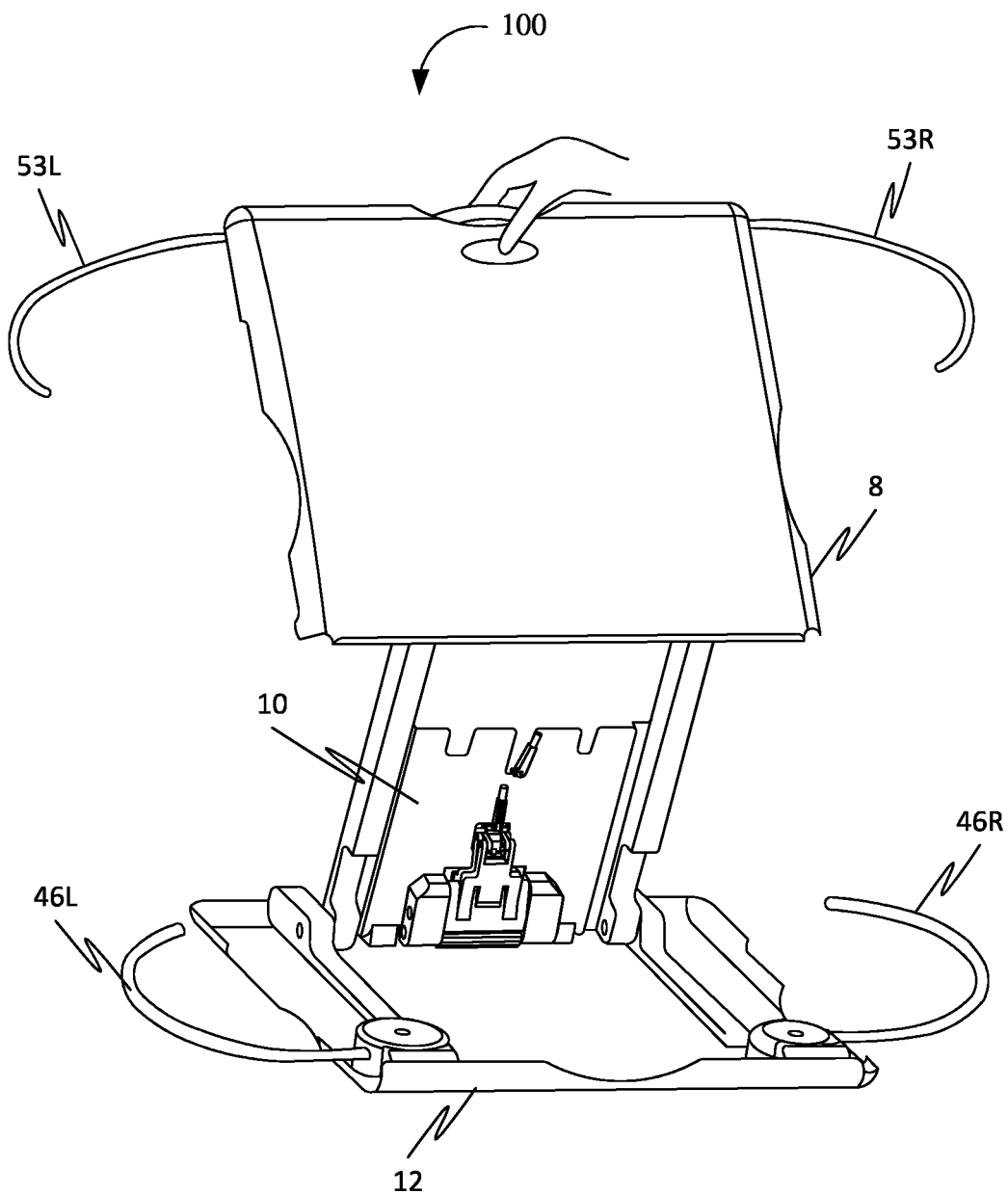
FIG. 3 is a front perspective view of the portable adjustable stand in an extended configuration, in accordance with some embodiments.

FIG. 3 is a front perspective view of the portable adjustable stand 100 in an extended configuration, in accordance with some embodiments.

Figure 4:
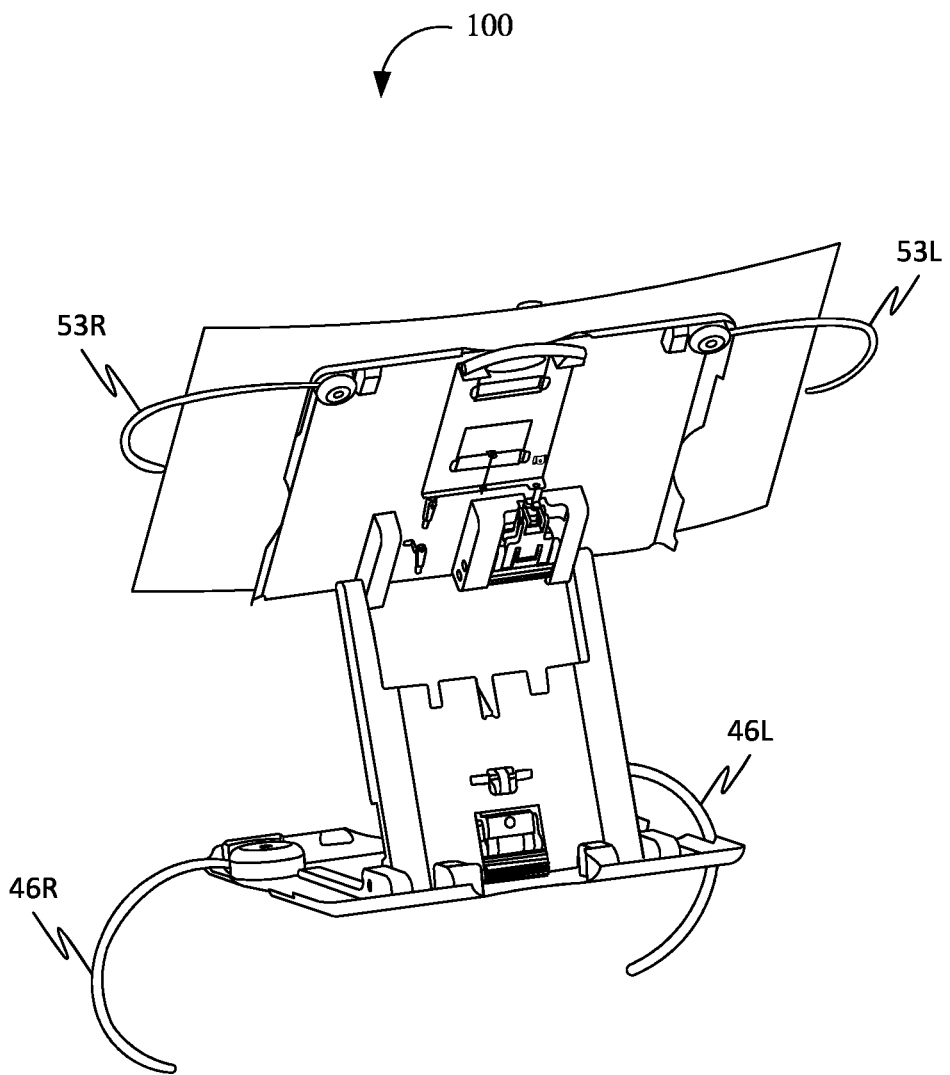
FIG. 4 is a rear perspective view of the portable adjustable stand in the extended configuration, in accordance with some embodiments.

FIG. 4 is a rear perspective view of the portable adjustable stand 100 in the extended configuration, in accordance with some embodiments.

Figure 5:
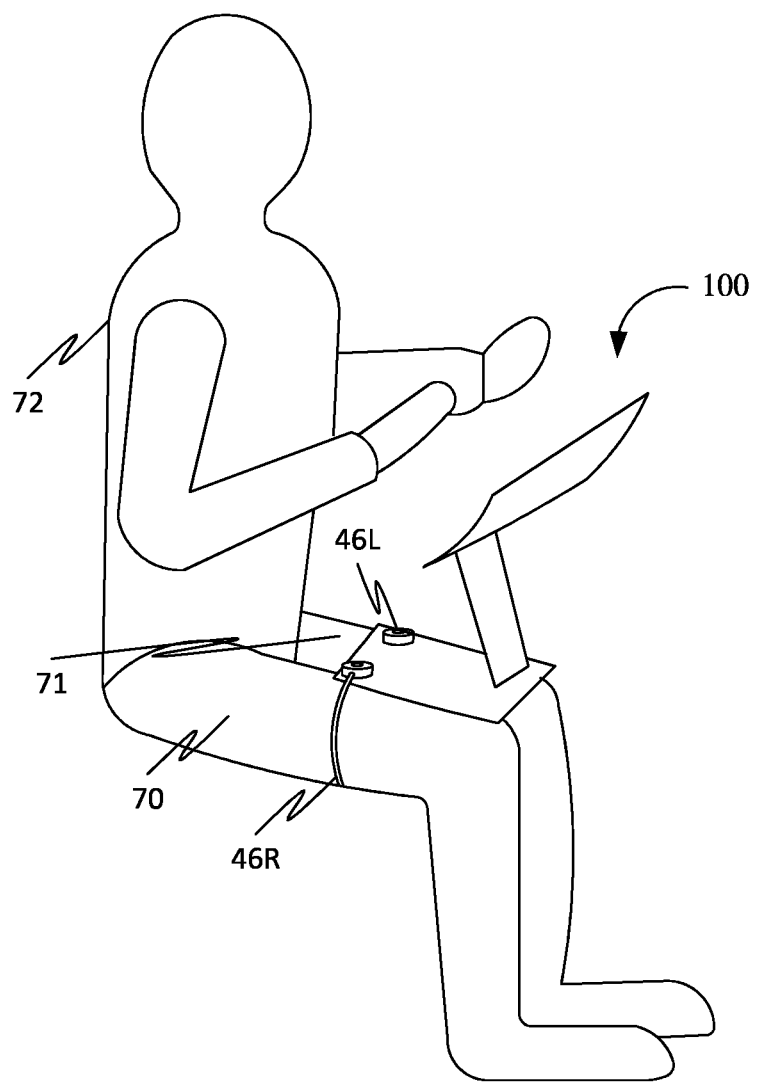
FIG. 5 is a side perspective view of the portable adjustable stand placed on a user's lap, in accordance with some embodiments.

FIG. 5 is a side perspective view of the portable adjustable stand 100 placed on a user's lap, in accordance with some embodiments.

Figure 6:
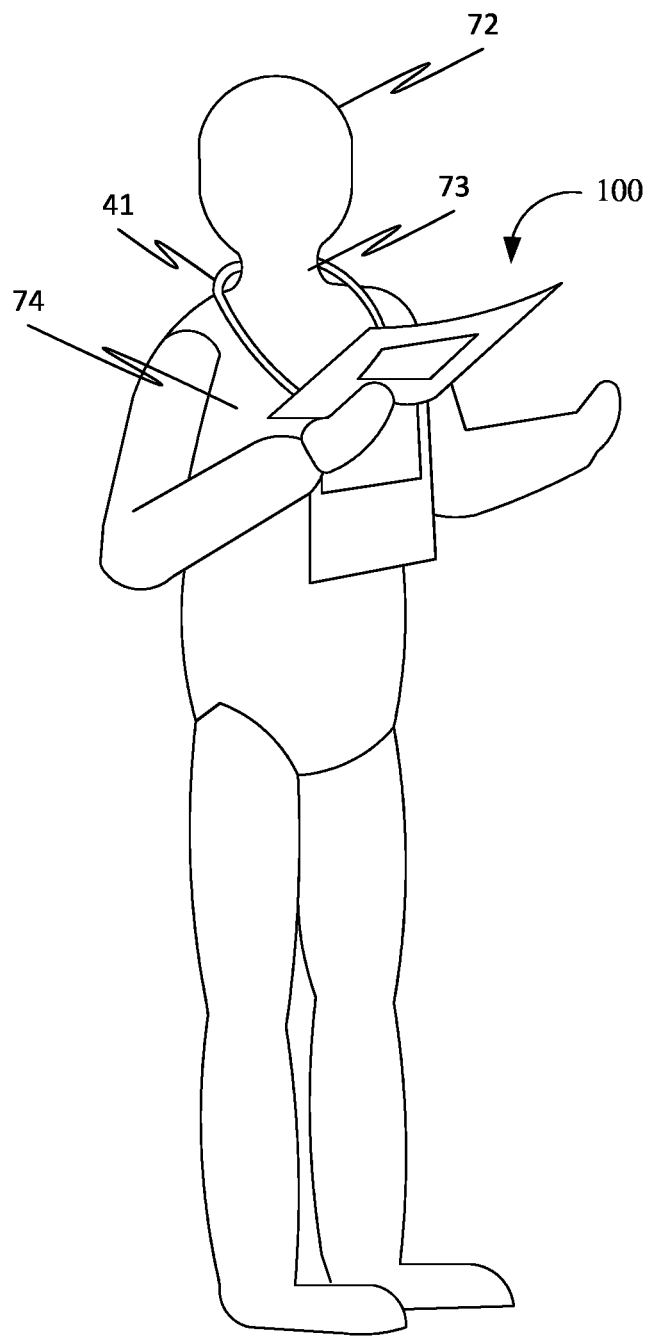
FIG. 6 is a side perspective view of the portable adjustable stand hung around a user's neck and placed on a user's chest, in accordance with some embodiments.

FIG. 6 is a side perspective view of the portable adjustable stand 100 hung around a user's neck 41 and placed on a user's chest 74, in accordance with some embodiments.

Figure 7:
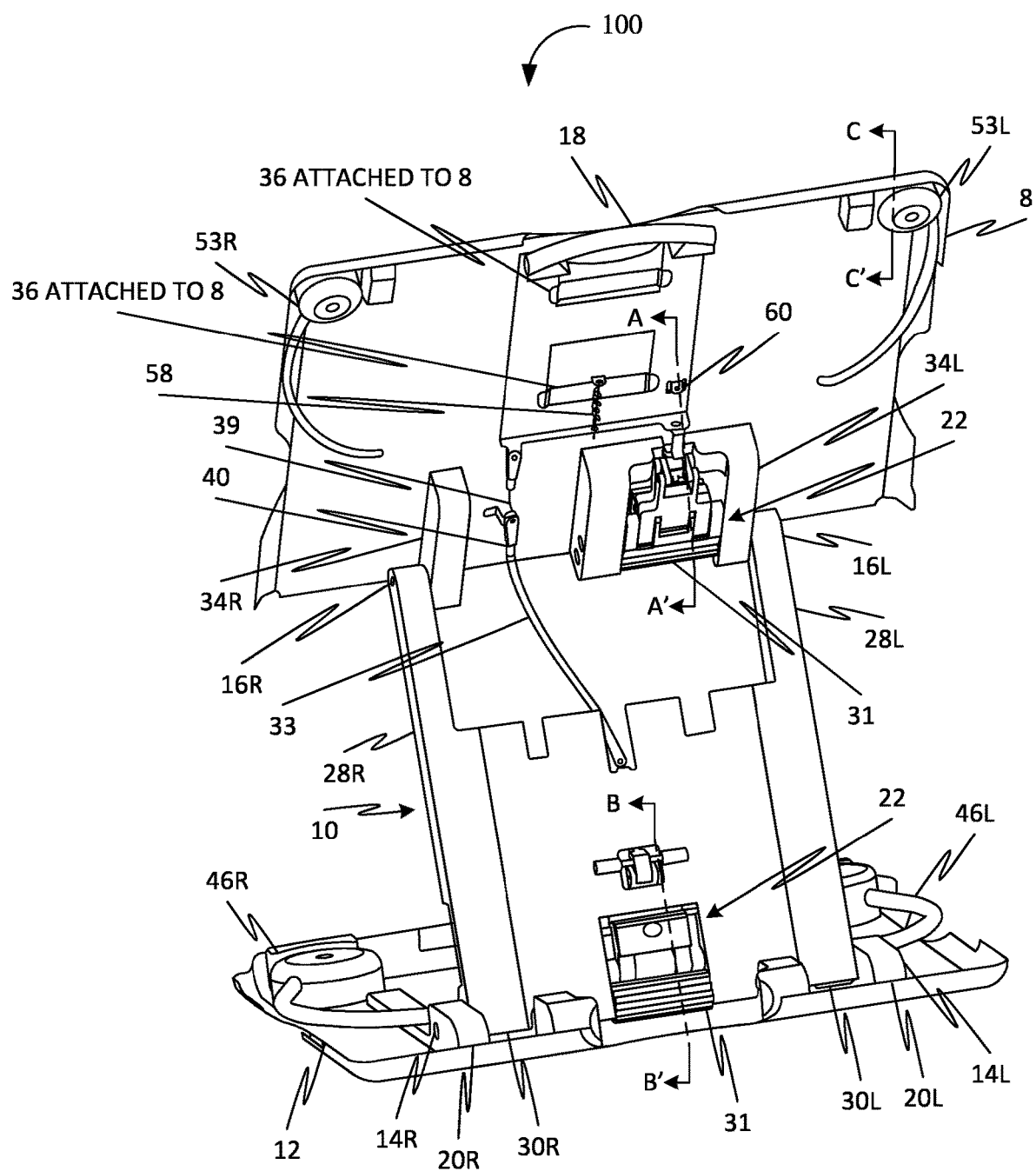
FIG. 7 is a rear perspective view of the portable adjustable stand in the extended configuration, in accordance with some embodiments.

FIG. 7 is a rear perspective view of the portable adjustable stand 100 in the extended configuration, in accordance with some embodiments.

Figure 8:
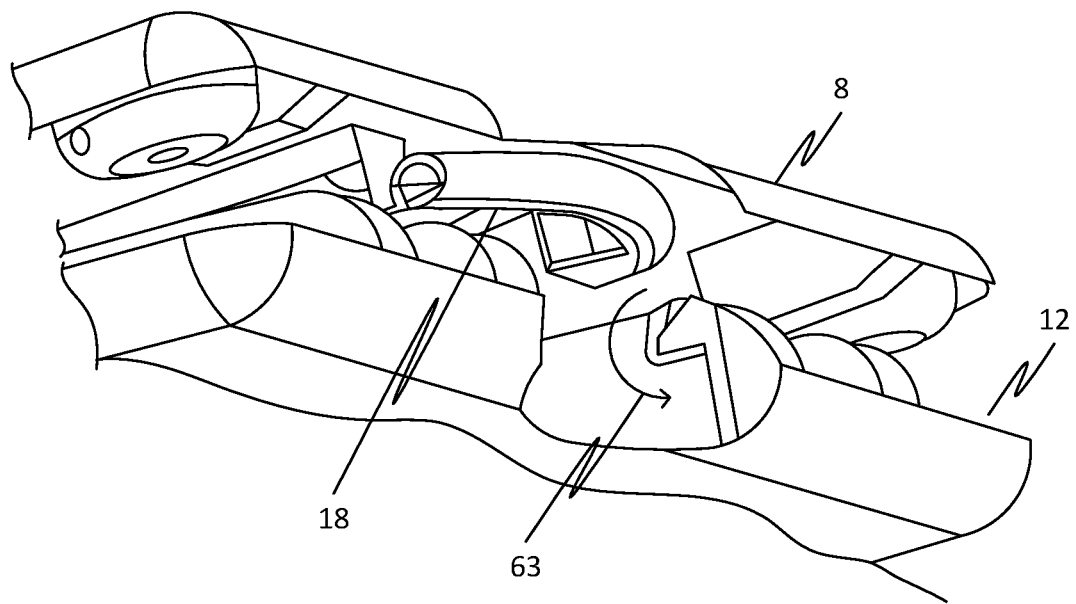
FIG. 8 is a partial view of the portable adjustable stand in the retracted configuration with a latch, in accordance with some embodiments.

FIG. 8 is a partial view of the portable adjustable stand 100 in the retracted configuration with a latch 18, in accordance with some embodiments.

Figure 9:
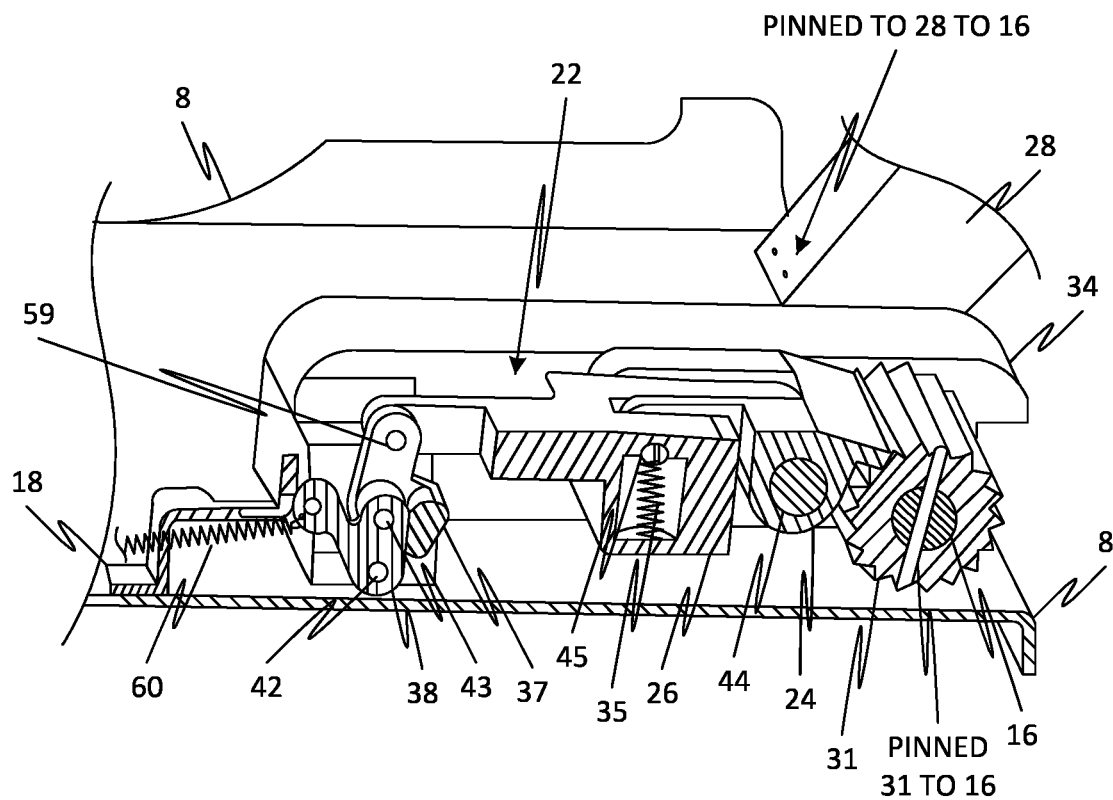
FIG. 9 is a cross-sectional view of the top plate of FIG. 7 taken along a line A-A' of FIG. 7 with a toggle mechanism in a locked position, in accordance with some embodiments.

FIG. 9 is a cross-sectional view of the top plate 8 of FIG. 7 taken along a line A-A' of FIG. 7 with a toggle mechanism 22 in a locked position, in accordance with some embodiments.

Figure 10:
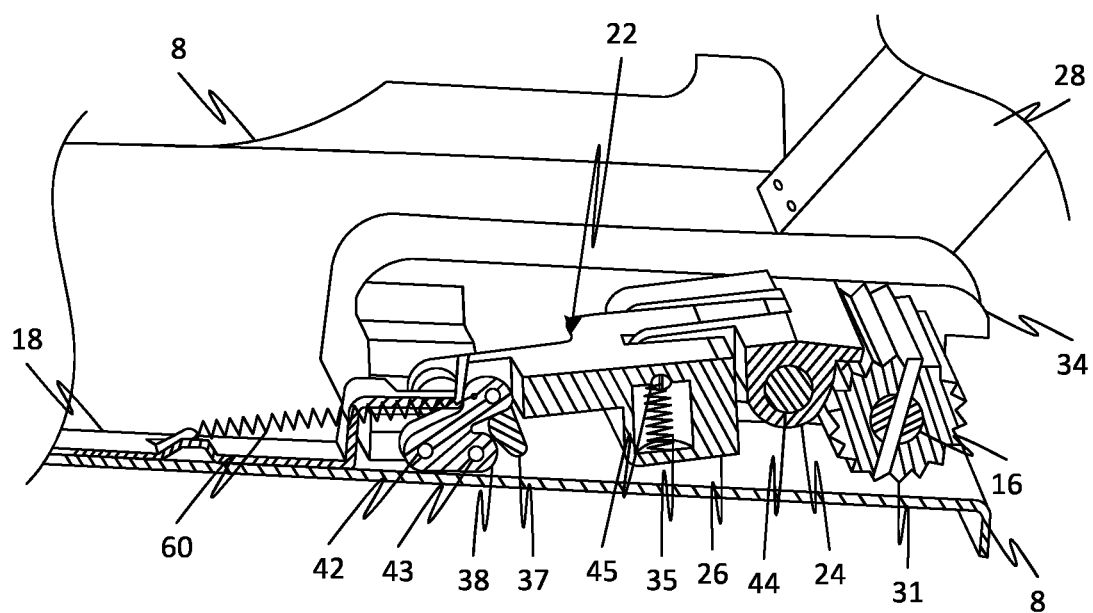
FIG. 10 is a cross-sectional view of the top plate of FIG. 7 taken along a line A-A' of FIG. 7 with the toggle mechanism in an unlocked position, in accordance with some embodiments.

FIG. 10 is a cross-sectional view of the top plate 8 of FIG. 7 taken along a line A-A' of FIG. 7 with the toggle mechanism 22 in an unlocked position, in accordance with some embodiments.

Figure 11:
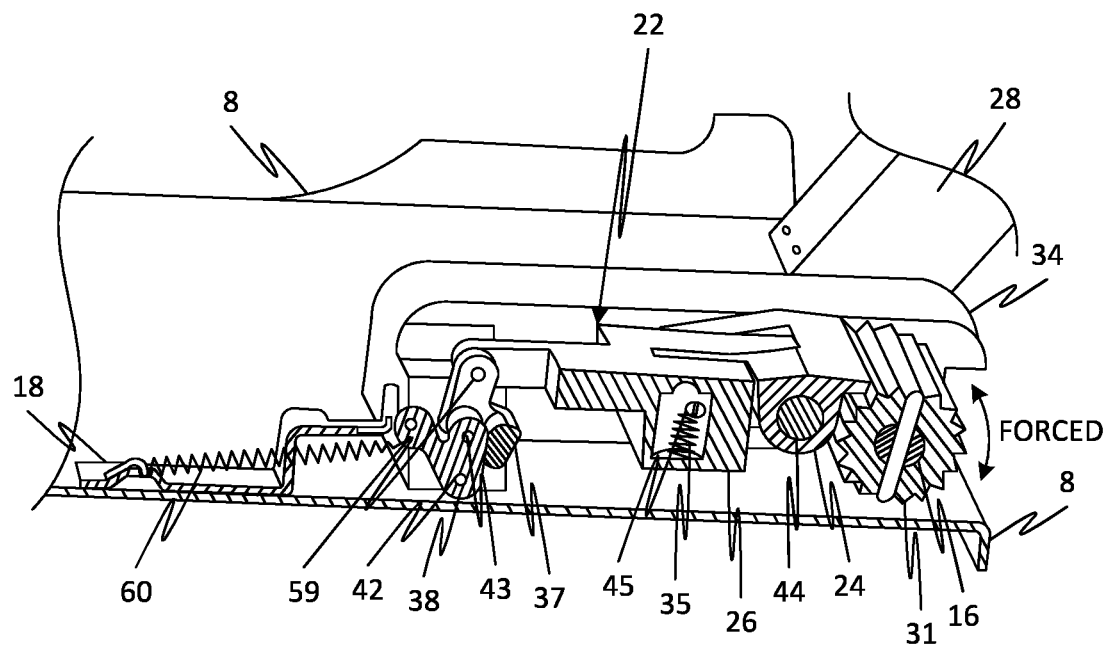
FIG. 11 is a cross-sectional view of the top plate of FIG. 7 taken along a line A-A' of FIG. 7 with the toggle mechanism in a forced unlocked position, in accordance with some embodiments.

FIG. 11 is a cross-sectional view of the top plate 8 of FIG. 7 taken along a line A-A' of FIG. 7 with the toggle mechanism 22 in a forced unlocked position, in accordance with some embodiments.

Figure 12:
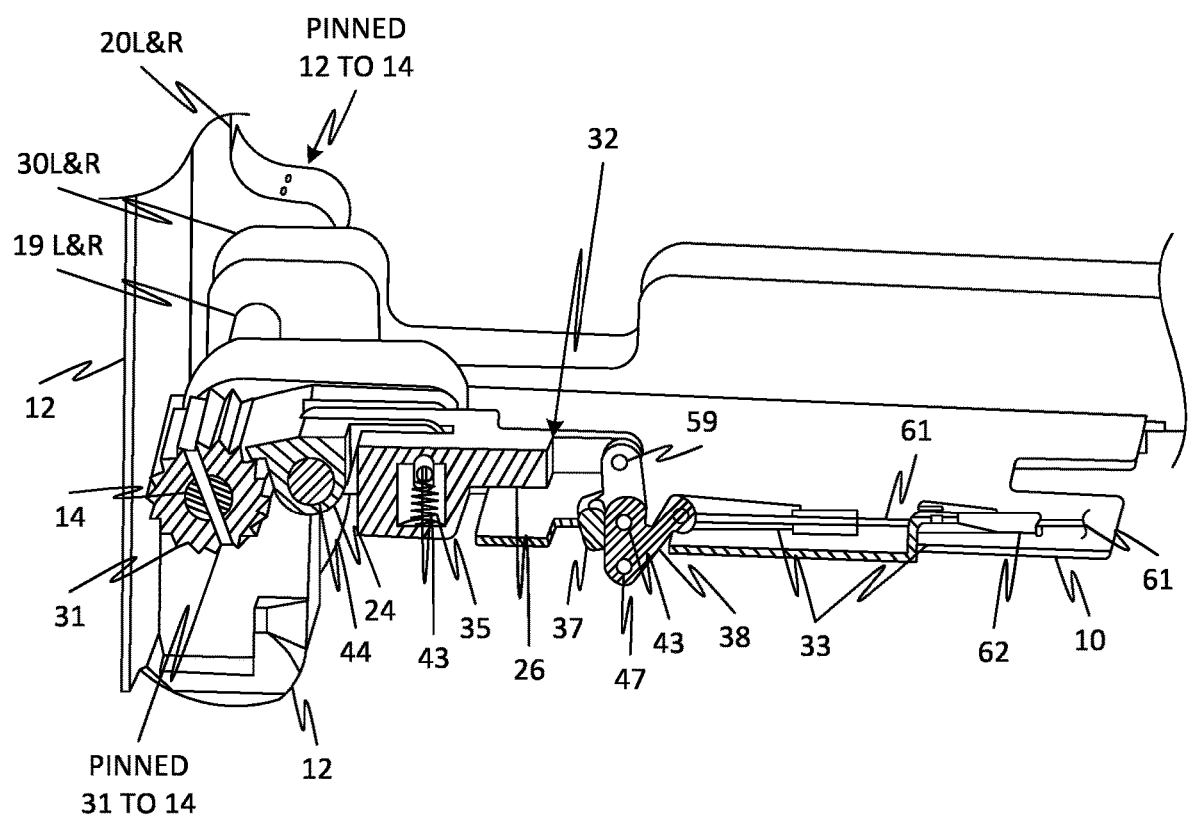
FIG. 12 is a cross-sectional view of the middle plate of FIG. 7 taken along a line B-B' of FIG. 7 with a toggle mechanism in a locked position, in accordance with some embodiments.

FIG. 12 is a cross-sectional view of the middle plate 10 of FIG. 7 taken along a line B-B' of FIG. 7 with a toggle mechanism 32 in a locked position, in accordance with some embodiments.

Figure 13:
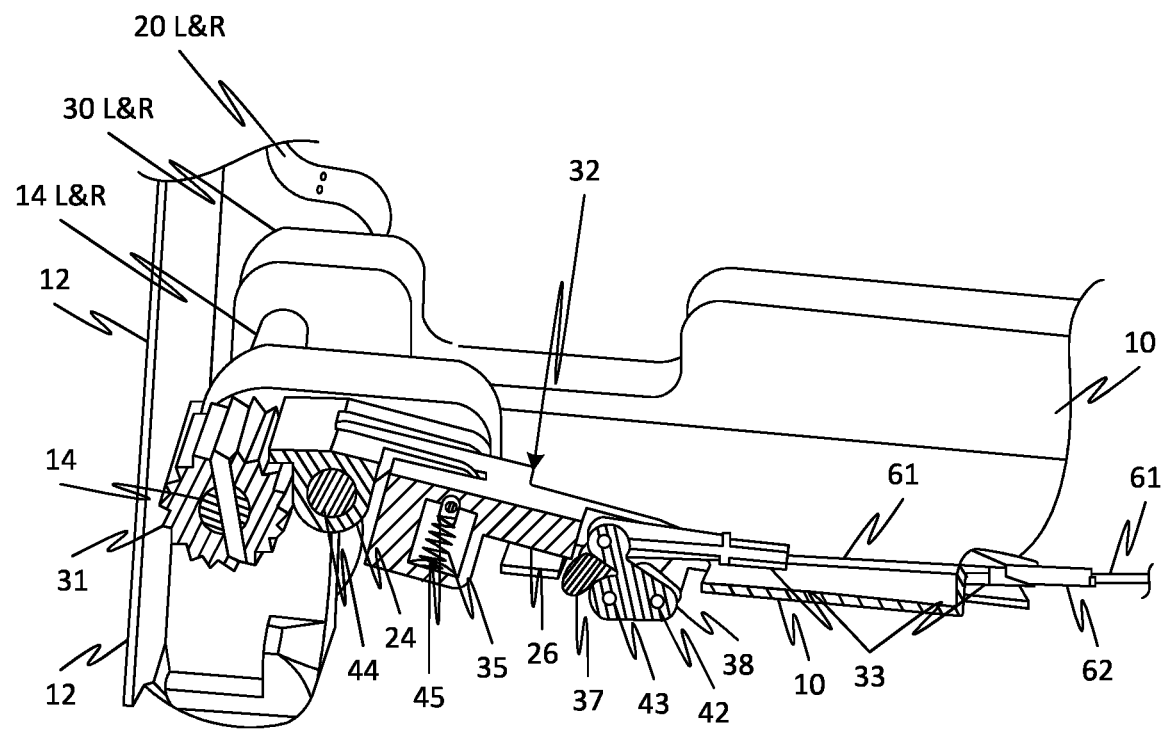
FIG. 13 is a cross-sectional view of the middle plate of FIG. 7 taken along a line B-B' of FIG. 7 with the toggle mechanism in an unlocked position, in accordance with some embodiments.

FIG. 13 is a cross-sectional view of the middle plate 10 of FIG. 7 taken along a line B-B' of FIG. 7 with the toggle mechanism 32 in an unlocked position, in accordance with some embodiments.

Figure 14:
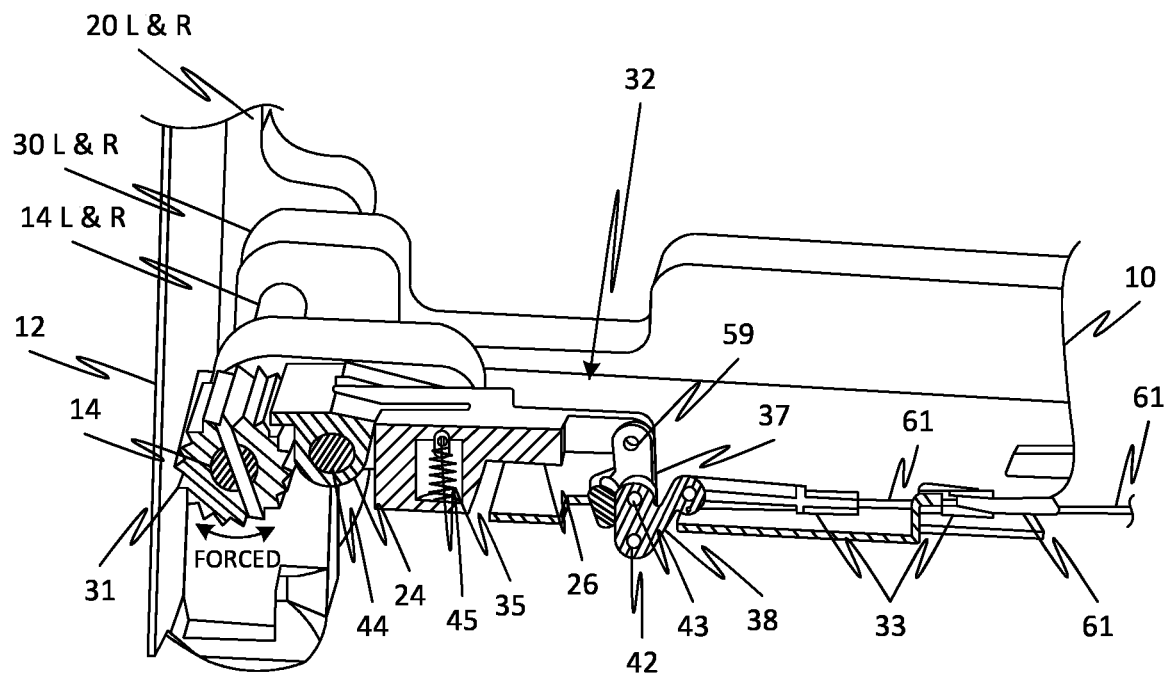
FIG. 14 is a cross-sectional view of the middle plate of FIG. 7 taken along a line B-B' of FIG. 7 with the toggle mechanism in a forced unlocked position, in accordance with some embodiments.

FIG. 14 is a cross-sectional view of the middle plate 10 of FIG. 7 taken along a line B-B' of FIG. 7 with the toggle mechanism 32 in a forced unlocked position, in accordance with some embodiments.

Figure 15:
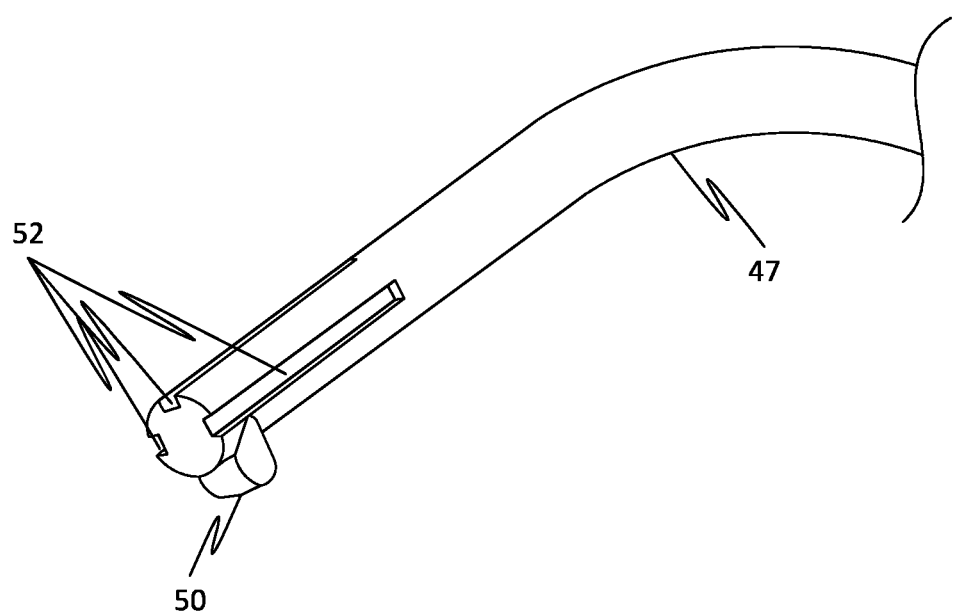
FIG. 15 is a top perspective view of a leg clamp arm of a clamp assembly, in accordance with some embodiments.

FIG. 15 is a top perspective view of a leg clamp arm 47 of a clamp assembly 46, in accordance with some embodiments.

Figure 16:
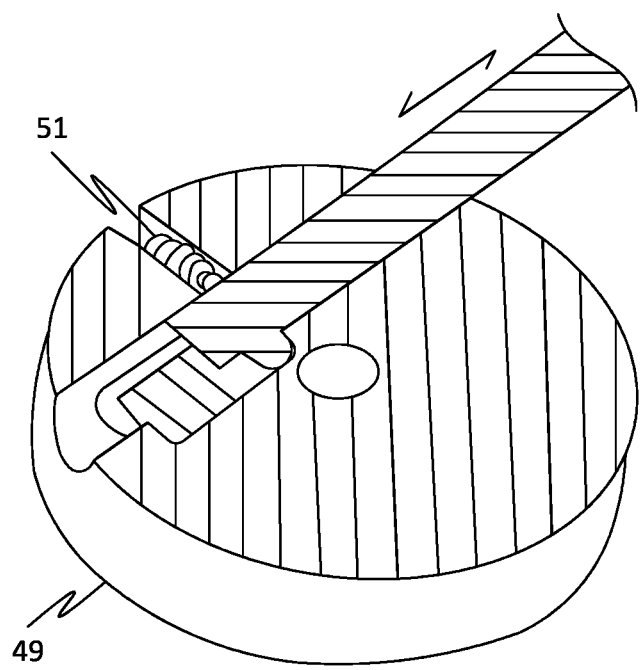
FIG. 16 is a top perspective view of a clamp stand of the clamp assembly, in accordance with some embodiments.

FIG. 16 is a top perspective view of a clamp stand 49 of the clamp assembly 46, in accordance with some embodiments.

Figure 17:
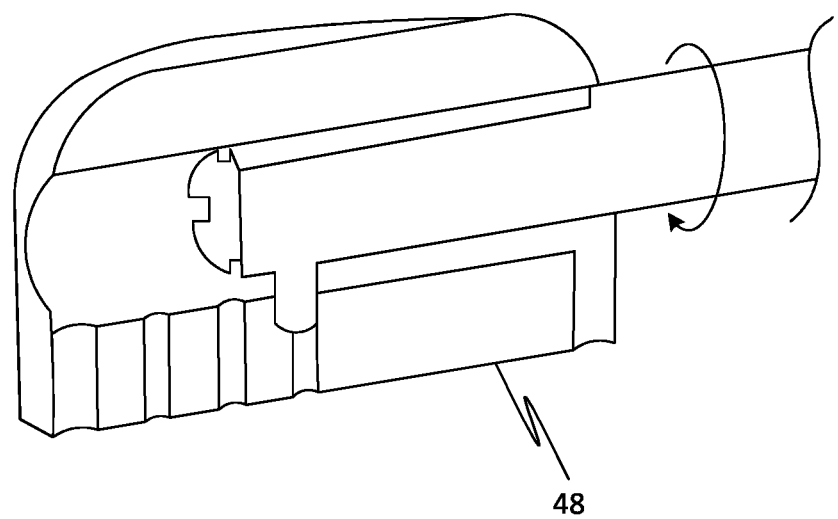
FIG. 17 is a cross-sectional view of a base of the clamp assembly, in accordance with some embodiments.

FIG. 17 is a cross-sectional view of a base 48 of the clamp assembly 46, in accordance with some embodiments.

Figure 18:
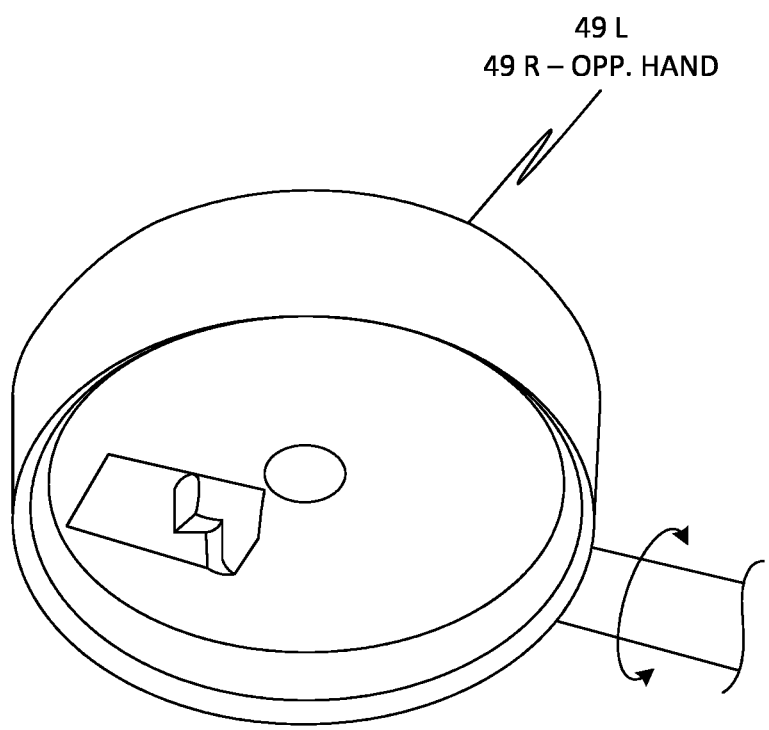
FIG. 18 is a top perspective view of a clamp stand of the clamp assembly, in accordance with some embodiments.

FIG. 18 is a top perspective view of a clamp stand 49 of the clamp assembly 46, in accordance with some embodiments.

Figure 19:
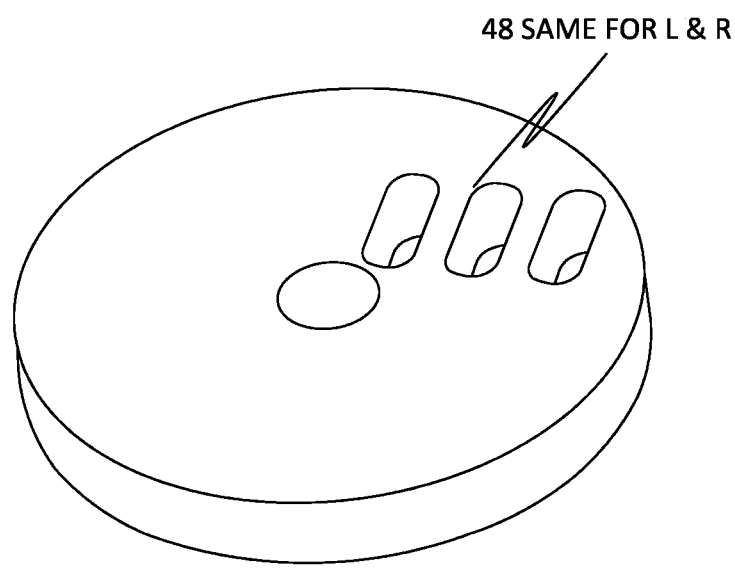
FIG. 19 is a top perspective view of the base of the clamp assembly, in accordance with some embodiments.

FIG. 19 is a top perspective view of the base 48 of the clamp assembly 46, in accordance with some embodiments.

Figure 20:
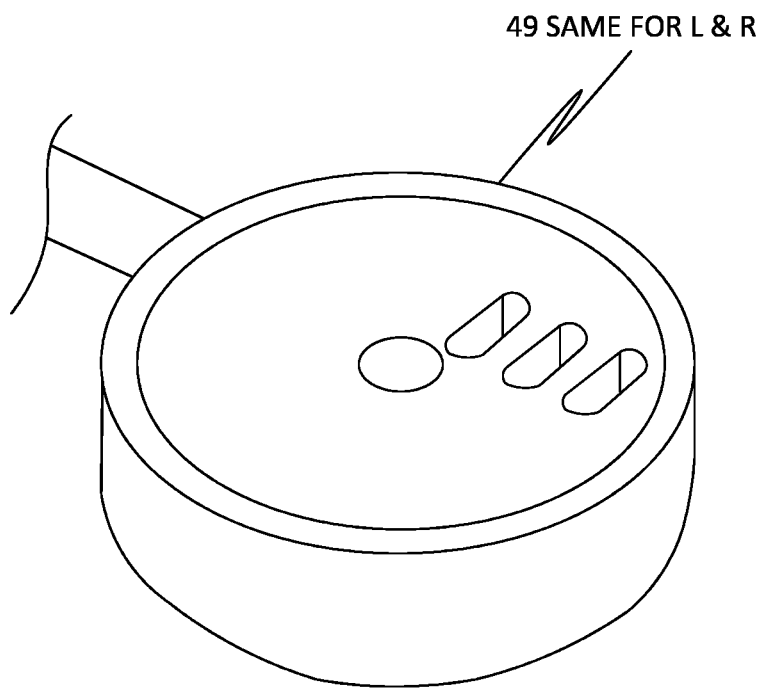
FIG. 20 is a top perspective view of the clamp stand of the clamp assembly, in accordance with some embodiments.

FIG. 20 is a top perspective view of the clamp stand 49 of the clamp assembly 46, in accordance with some embodiments.

Figure 21:
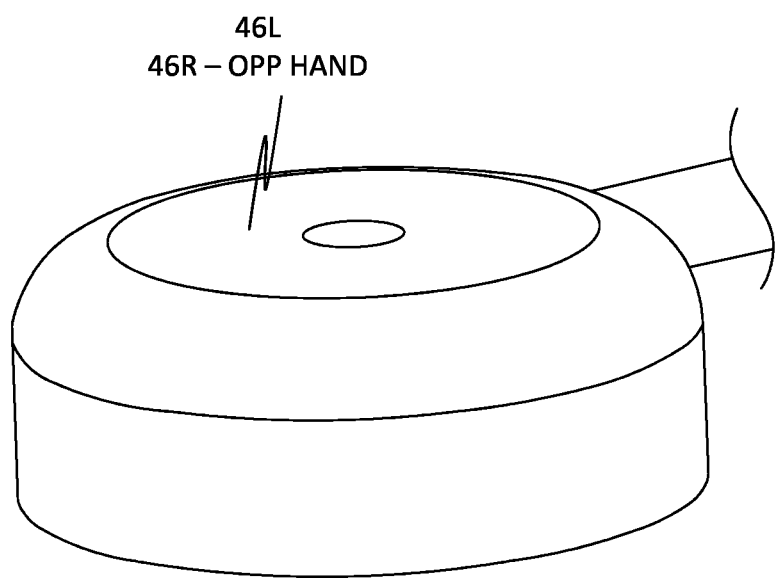
FIG. 21 is a top perspective view of the clamp assembly, in accordance with some embodiments.

FIG. 21 is a top perspective view of the clamp assembly 46, in accordance with some embodiments.

Figure 22:
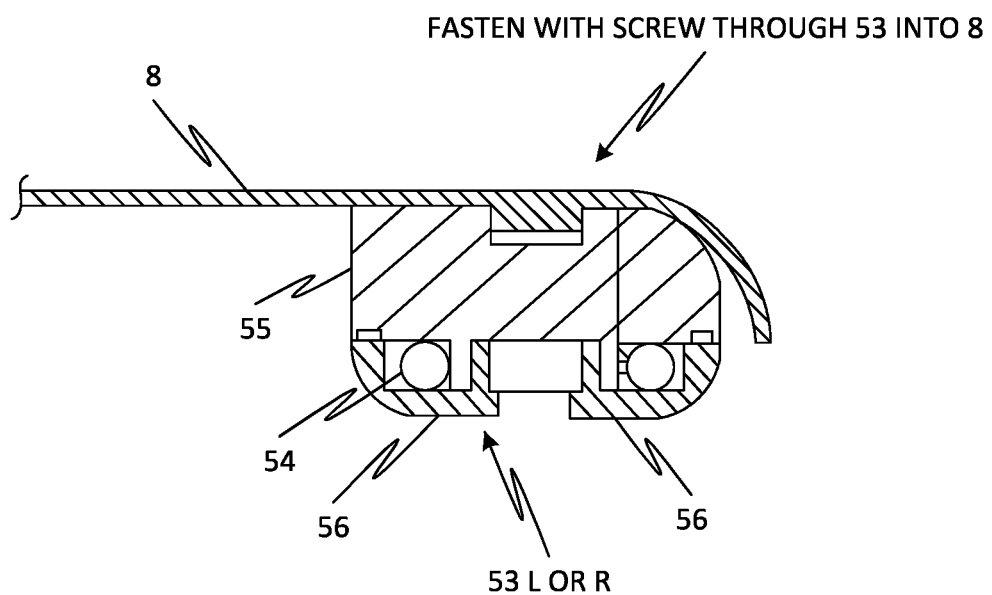
FIG. 22 is a cross-sectional view of the top plate of FIG. 7 taken along a line C-C' of FIG. 7 with the page support, in accordance with some embodiments.

FIG. 22 is a cross-sectional view of the top plate 8 of FIG. 7 taken along a line C-C' of FIG. 7 with the page support assembly 53, in accordance with some embodiments.

Figure 23:
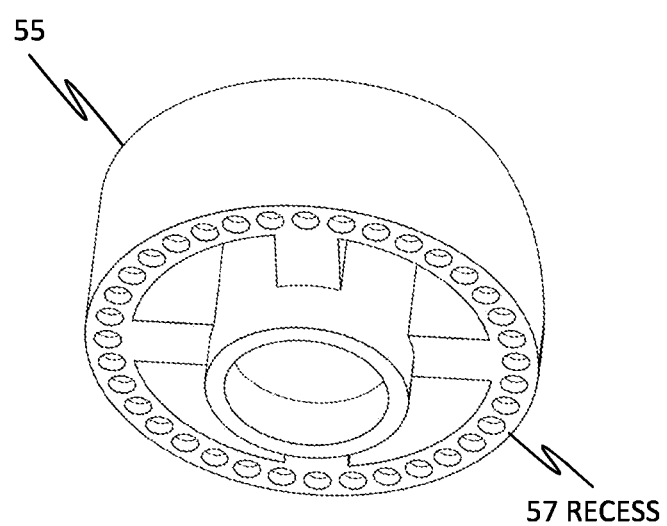
FIG. 23 is a bottom perspective view of a base of a page support assembly, in accordance with some embodiments.

FIG. 23 is a bottom perspective view of a base 55 of a page support assembly 53, in accordance with some embodiments.

Figure 24:
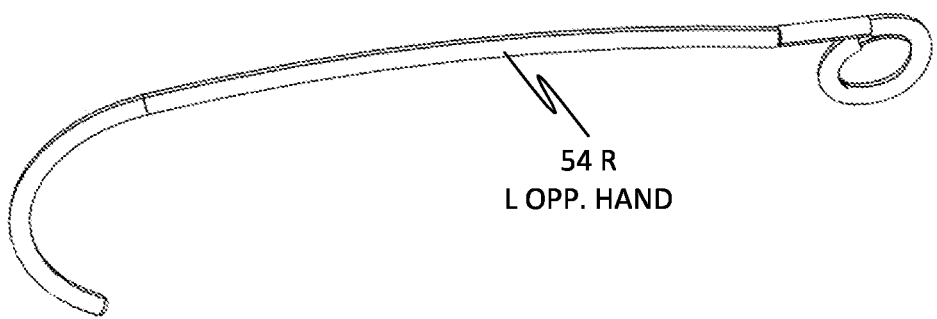
FIG. 24 is a top perspective view of a page support of the page support assembly, in accordance with some embodiments.

FIG. 24 is a top perspective view of a page support 53 of the page support assembly 53, in accordance with some embodiments.

Figure 25:
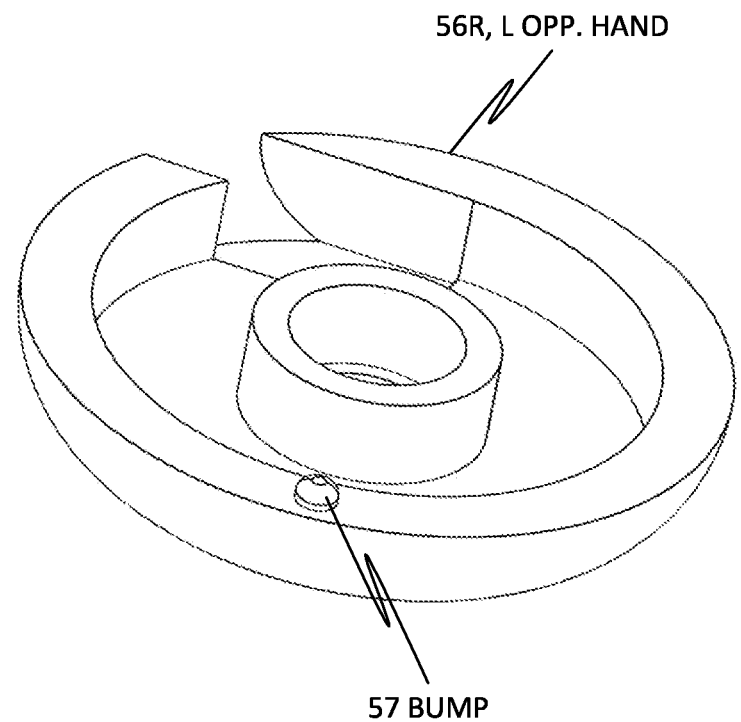
FIG. 25 is a bottom perspective view of a cap of the page support assembly, in accordance with some embodiments.

FIG. 25 is a bottom perspective view of a cap 56 of the page support assembly 53, in accordance with some embodiments.

Figure 26:
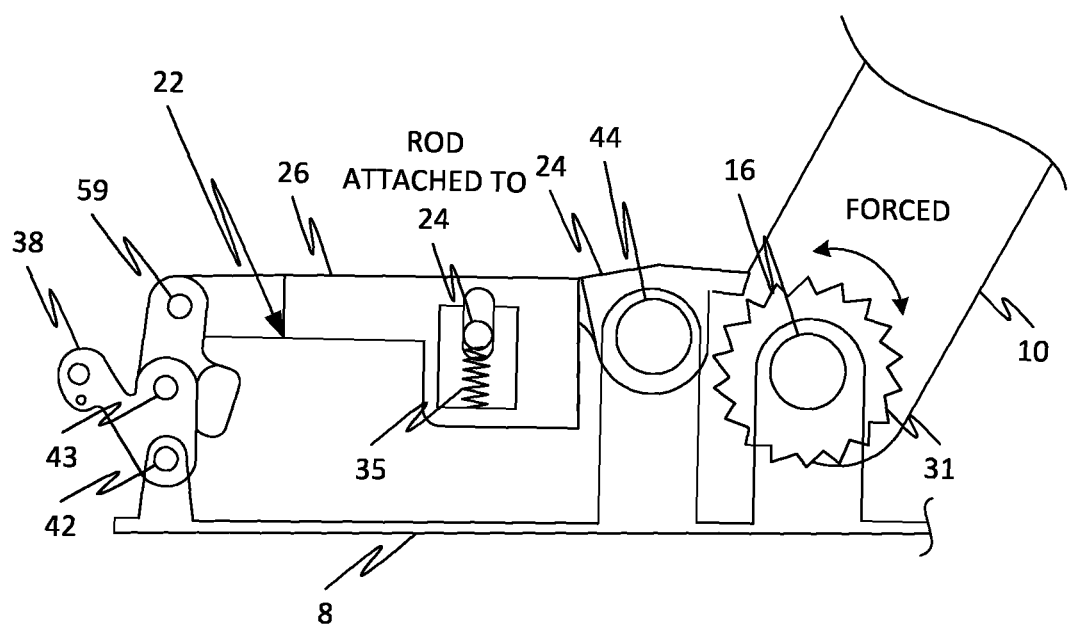
FIG. 26 is a side view of the toggle mechanism, in accordance with some embodiments.

FIG. 26 is a side view of the toggle mechanism 22, in accordance with some embodiments. Further, the toggle mechanism 22 is with a forced load on the ratchet 31. Further, a push or pull on an arm of the link 38 will untoggle or set toggle.

With respect to FIGS. 1-26, the portable adjustable stand 100 is a portable adjustable book stand 100 that may be used anywhere. Further, the portable adjustable stand 100 is an apparatus comprising a small light weight hand carried mechanism with a top surface. It can be comprised of a top plate 8, middle plate 10, and bottom plate 12 hinged together to allow vertical and tilt positioning of the top plate 8 for use. The portable adjustable stand 100 may be a unit that can sit on surfaces similar to a tabletop or the lap of a sitting person (as shown in FIG. 5). The unit is to placed on the legs of the user while sitting on chairs. The unit is prevented from sliding off the legs when the legs are angled downwards. And if the unit is to be placed on a tabletop, the hooks around the legs will be loaded back into the unit to be out of the way. A standing person 72, as shown in FIG. 6 could also use the unit by supporting it from a strap 41 around the neck 73. A hand actuated latch 18 in FIGS. 1, 2 & 3 on the edge of the top surface will release a lock preventing opening between the top plate 8 and the bottom plate 12 with the unit in its retracted position, as shown in FIG. 1. This same action releases a lock on the hinges that allow rotation of the plates 8,10, and 12 in relation to each other or with the plates 8, 10, and 12 in any position. The latch 18 is operated by a squeezing grip between the fingers and thumb of either left- or right-hand FIGS. 2 & 3. This same grip will allow the lifting of plates 8 & 10 for user 72 positioning. Usually, a lap will be sloping so the unit has the means to hold it from slipping on the lap by retractable clamps 46 *l* & *r*. That can fasten onto the upper part of the user's legs 70-71, as shown in FIG. 5. Page supports 53 *l* & *r* can be extended out from the top plate 8, as shown in FIG. 4, to help support papers extending out beyond the width of the top surface or used to hold pages of a book open on the top surface.

The description of the design of the unit is divided into separate functional parts. The first functional part to be explained is how the hinge action between the middle plate 10 and the top plate 8 is locked and unlocked by the hand control latch 18 on the top plate 8. Referring to FIGS. 7 & 8, the top plate 8 has a sliding latch 18 controlled by hand. This squeezing motion by the hand to slide the latch 18 controls the lock between top plate 8 and bottom plate 12 at 63, as shown in FIG. 8. This same motion will lock and unlock the hinging motion between the plates 8, 10, and 12 with the unit in any configuration. Referring to FIG. 9, the toggle 22 is shown in its locked position locking the hinging motion between the top plate 8 and the middle plate 10. The top plate 8 and middle plate 10 are hinged by shaft 16 $l$ & $r$ supported by 34 $l$ & $r$ on the top plate 8 extending through the ratchet 31 and supported by 28 $l$ & $r$ on the middle plate 10. This shaft 16 $l$ & $r$ is pinned to not rotate on supports 28 $l$ & $r$ on the middle plate 10 and pinned not to rotate relative to the ratchet 31. The toggle mechanism 22 mounted on the top plate 8, controls the lock of ratchet 31 relative to the top plate 8 locking the hinging action between the top plate 8 and the middle plate 10. This lock is through the tooth on pawl 24 engaging the teeth on the ratchet 31. The pivot action of pawl 24 around shaft 44 is through its couple to pawl 26 which also pivots around shaft 44 & is activated by the toggle of link 38 with link 37. FIG. 10 shows unlocking of the hinge of top plate 8 to middle plate 10 by disengaging the pawl 24 from ratchet 31. The sliding motion of latch 18 against link 38 rotates link 38 around shaft 42 which in turn rotates link 37 around shaft 43. Link 37 rotates around shaft 59 & shaft 43 to move pawl 26 to pivot around shaft 44. When the hand releases latch 18, and the latch 18 is returned by the spring 58 attached to the latch 18 on one end and to the guide 36 on the other end, as shown in FIG. 7. Link 38 returns to the locked toggle position by spring 60 allowing pawl 24 to engage ratchet 31 when their teeth align, as shown in FIG. 9. Referring to FIG. 11, the couple of pawl 24 to pawl 26 allows excessive loads applied through the ratchet 31 to react through the couple rod 45 mounted on link 24 deflecting the couple spring 35 without pivoting pawl 26. The toggle remains locked. These excessive loads (which could damage the mechanism) can be due to forces to pivot the plates on their hinge shafts without unlocking the toggle lock. The angle of the contact surfaces on the ratchet teeth 31 to the tooth on pawl 24 is such that the contact will slide disengaging the teeth. This disengagement will accrue with the forces in either direction on ratchet 31. The couple spring 35 will return the pawl 24 to engage the ratchet 31 after the load is removed from the ratchet 31.

Referring to FIG. 12, the second functional part to be explained is how the hinge action between the middle plate 10 and the bottom plate 12 is locked and unlocked by the hand-controlled latch 18 on the top plate. The middle plate 10 and bottom plate 12 are hinged by shaft 14 $l$ & $r$ and supported on the middle plate 10 by 30 $l$ & $r$ extending through the ratchet 31 and supported by 20 $l$ & $r$ on the bottom plate 12. This shaft 14 is pinned to not rotate on supports 20 $l$ & $r$ on the bottom plate 12 and not to rotate relative to the ratchet 31. The hinge motion between the middle plate 10 and bottom plate 12 is controlled by locking the rotation of the ratchet 31 to the middle plate 10. The toggle mechanism 32 mounted on the middle plate 10 locks and unlocks the rotation of the ratchet 31 relative to the middle plate 10. This toggle action is the same as described in the previous motion of the top plate 8 to the middle plate 10. The control of this toggle is also through the sliding motion of the latch 18 but through a control cable 33, as shown in FIG. 7. On one end of control cable 33 the inner cable 39 is fastened to the latch 18. The outer tube 40 of the cable 33 at this end, is fastened to the top plate 8. On the other end of control cable 33, the inner cable 61 is fastened to the pawl 38, FIGS. 12 & 13. The outer tube 62 at this end is fastened to the middle plate 10. The spring return 58 of the latch 18 returns the link 38 which through the mechanism & control cable 33 will return the pawl 24 to engage the teeth of ratchet 31 when they align. There may be cases that accrue when the tooth engagement with the two ratchets and their pawl 24 is not aligned simultaneously when the hand load is removed from the latch 18 and further relative motion between the plates is necessary to align the teeth. In this case, latch 18 is free to return and another spring 60 between latch 18 and link 38, FIGS. 10 & 11 continually apply a load to engage the teeth when they align.

The third functional part is the clamp assembly 46 $l$ and $r$, as shown in FIGS. 2, 3, 4, and 5 are used to help hold the unit on a person's lap by partially wrapping around their upper leg 70-71 in FIGS. 4 and 5. When not in use they are stored in position, as shown in FIG. 2. The units are composed of 3 parts. A base 48 fastened to the bottom plate 12 not to rotate on the bottom plate 12 FIG. 19. The leg clamp arm 47 and clamp stand 49 $l$ & $r$, rotate together on the base 48 FIGS. 15, 18 & 19. The clamp assembly 46 $l$ & $r$ is held together with a screw through the middle of the leg clamp assembly 46 $l$ & $r$. The clamp base 48 and clamp arm 47 are the same part for either left or right. To use these arm assemblies they are first rotated about 90. Degrees outboard from their stored position as shown in FIG. 2 and FIG. 3. In this position the clamp arms 47 can be pulled outward from the base to suit the width for the legs 70-71 of the user 72 in FIGS. 3, 4, and 5. There are 3 width positions FIGS. 16, 17, 18 & 20 for this motion where the arm can be swiveled down about 90 degrees for use, as shown in FIG. 4 and FIG. 5. In this position they are locked from moving in or out, or rotating on the base 48. There is a spring detent 51 on the clamp stand 49$l$ and r that springs into grooves on 47 that will indicate when the arm is in either of these two 90-degree positions FIGS. 15, 3 & 4. The fourth functional part is the page support arm assembly 53 $l$ and $r$ and is attached to the underside of the top plate 8, as shown in FIGS. 4, 7 & 22. They may be used to support a document that extends wider than the top plate 8, as shown in FIG. 4, or can wrap around the top plate 8 to hold documents on the top plate 8. They are stored out of use by swinging in under the top plate 8, as shown in FIG. 7. There are three parts to this assembly 53 $l$ & $r$. The base 55 fastens to the top plate 8, not to swivel. The page supports 54 $l$ & $r$ with a loop formed on one end nests on the base 55 and a cap 56 $l$ or $r$ covers over these capturing the page support 54 $l$ or $r$ to swivel with it, as shown in FIG. 22. The assembly 53 $l$ or $r$ is fastened together to the base 55 by a screw through the middle into the top plate 8. The cap 56 $l$ or $r$ and wire 54 $l$ or $r$ swivel on the base 55 with a detent 57 positioning between their surfaces to hold the swivel position. The spring load on the detent is obtained by the axial spring of the cap 56 between the holding screw and the outer rim of the base 55 and the outer rim of the cap 56.

Further, the unit may include an electrically operated mechanism (such as actuators, solenoids, motor assembly, etc) for controlling rotation around axes between pawl and wheel. Further, the electrically operated mechanism control of angles between of each the 3 plates. Further, the electrically operated mechanism may be coupled to the junctions between each plate. Further, the solenoid may have a definite position relative to a ratchet wheel, and a battery may be positioned within available the closed up unit The unit is made using parts made by machining, 3d printing, and hand forming. A lower cost volume production design that would perform the same would be made using molded plastic and metal machine forming dies where applicable. The number of ratchet teeth could be reduced to only the amount needed for the hinge motion of the plates. A non-slip surface could be added to the outer top and bottom of the unit to ease the handling. The pawls could be activated by electrical solenoids interacting with independent ratchet wheels on each of the hinge shafts. A Battery is added for operating the solenoids. Electric clutches or brakes could be substituted for the pawl/ratchet interface to control the hinge action.

Figure 27:
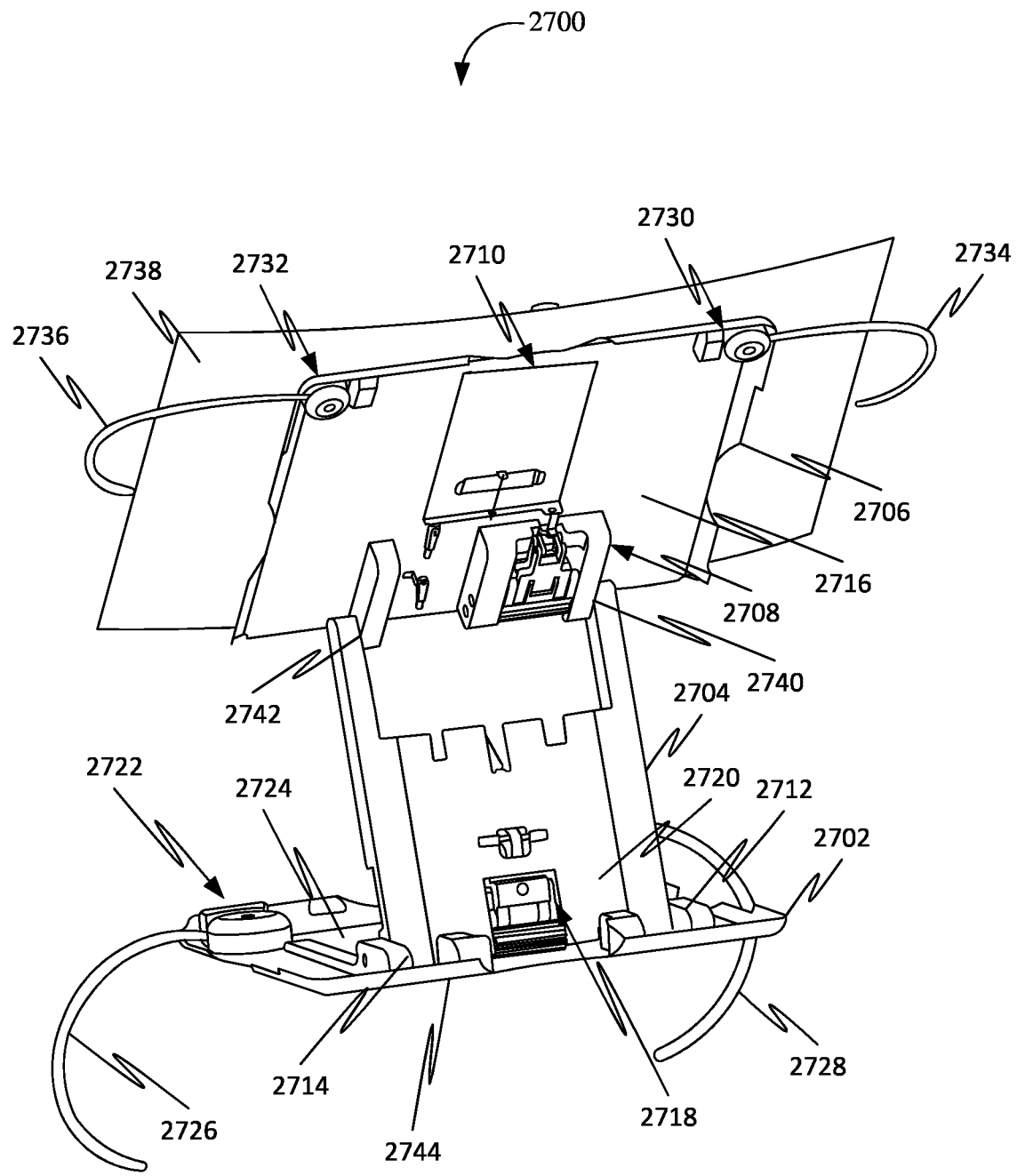
FIG. 27 is a rear perspective view of an adjustable stand for supporting objects on the adjustable stand, in accordance with some embodiments.

FIG. 27 is a rear perspective view of an adjustable stand 2700 for supporting objects on the adjustable stand 2700, in accordance with some embodiments. Accordingly, the adjustable stand 2700 may include a bottom plate 2702, a middle plate 2704, a top plate 2706, a toggle mechanism 2708, and at least one actuating device 2710.

Further, the middle plate 2704 may be pivotably coupled to the bottom plate 2702 using a first coupling mechanism 2712-2714. Further, the first coupling mechanism 2712-2714 may be a hinge. Further, the middle plate 2704 pivots between a closed position and at least one open position in relation to the bottom plate 2702 about a first pivoting axis of the first coupling mechanism 2712-2714 using the first coupling mechanism 2712-2714 for adjusting a height of the adjustable stand 2700.

Further, the top plate 2706 may be pivotably coupled to the middle plate 2704 using a second coupling mechanism 2740-2742. Further, the second coupling mechanism 2740-2742 may be a hinge. Further, the top plate 2706 pivots between a plurality of positions in relation to the middle plate 2704 about a second pivoting axis of the second coupling mechanism 2740-2742 using the second coupling mechanism 2740-2742 for adjusting an orientation of the top plate 2706 in relation to the middle plate 2704.

Further, the toggle mechanism 2708 may be mounted on a bottom surface 2716 of the top plate 2706. Further, the toggle mechanism 2708 may be operatably coupled with the second coupling mechanism 2740-2742. Further, the toggle mechanism 2708 may be transitionable between a locked state and an unlocked state. Further, the toggle mechanism 2708 allows pivoting of the top plate 2706 in the unlocked state and restricts the pivoting of the top plate 2706 in the locked state. Further, the at least one actuating device 2710 may be operatably coupled with the toggle mechanism 2708.

Further, the at least one actuating device 2710 may be configured for transitioning the toggle mechanism 2708 from the locked state to the unlocked state based on the receiving of a first actuating input. Further, the at least one actuating device 2710 may be configured for transitioning the toggle mechanism 2708 from the unlocked state to the locked state based on the receiving of a second actuating input. Further, the toggle mechanism 2708 may be configured for transitioning to the unlocked state from the locked state based on applying a pivoting force on the top plate 2706 above a threshold pivoting force without the receiving of the first actuating input. Further, the toggle mechanism 2708 may be configured for transitioning to the locked state from the unlocked state based on releasing the pivoting force applied to the top plate 2706. Further, the first actuating input and the second actuating input may include an input force, an input action, a change of state of a device, etc.

Figure 28:
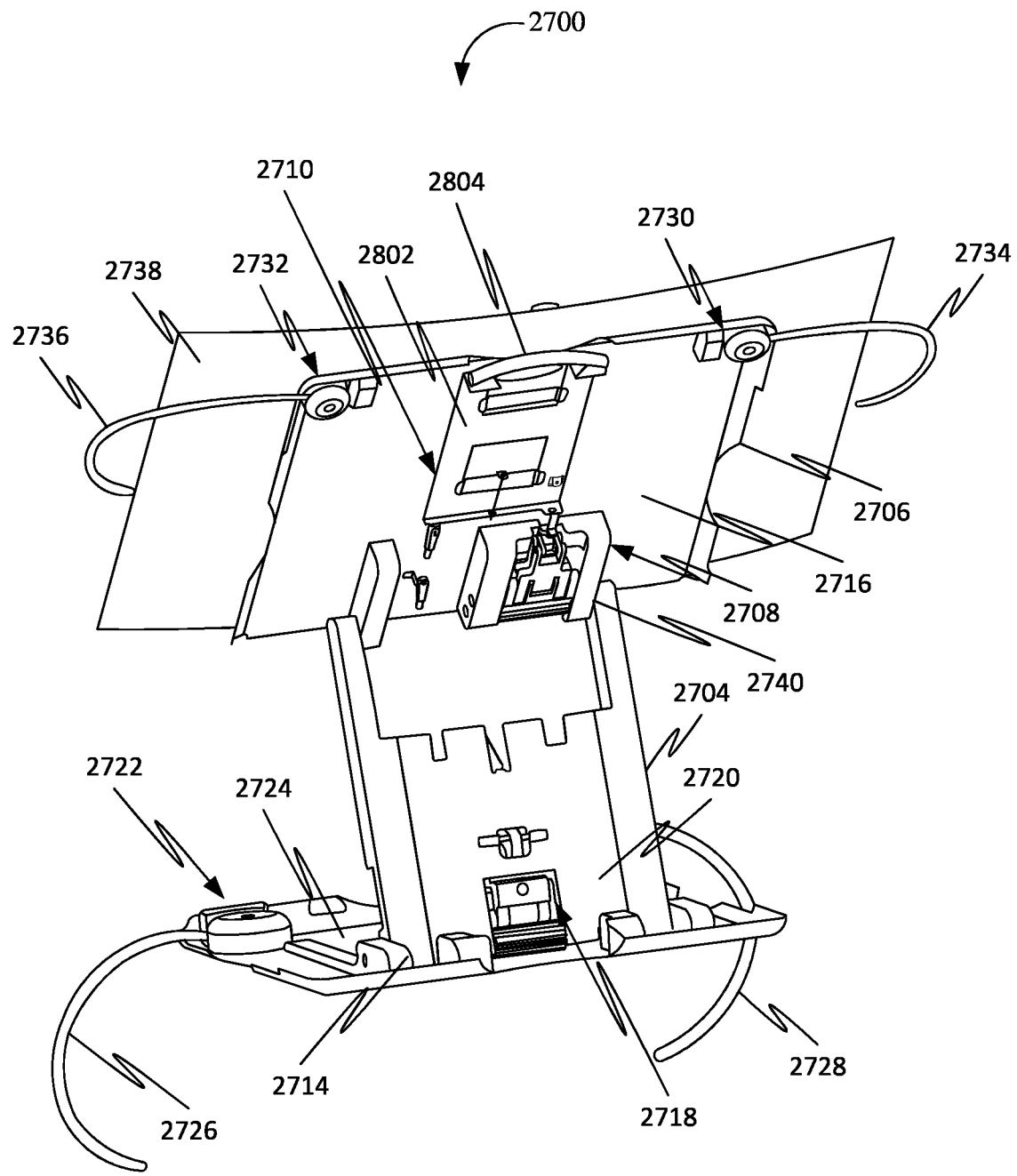
FIG. 28 is a rear perspective view of the adjustable stand, in accordance with some embodiments.

Further, in some embodiments, the at least one actuating device 2710 may include a latch mechanism 2802, as shown in FIG. 28, mounted on the bottom surface 2716 of the top plate 2706. Further, the latch mechanism 2802 may be operatably coupled with the toggle mechanism 2708. Further, the receiving of the first actuating input may include applying a pull force on a handle 2804 of the latch mechanism 2802. Further, the receiving of the second actuating input may include releasing the pull force applied to the handle 2804.

Further, in an embodiment, the transitioning to the unlocked state from the locked state may include transitioning to the unlocked state from the locked state based on the applying of the pivoting force on the top plate 2706 above the threshold pivoting force without the applying of the pull force on the handle 2804.

In further embodiments, the adjustable stand 2700 may include a first toggle mechanism 2718 mounted on a top surface 2720 of the middle plate 2704. Further, the first toggle mechanism 2718 may be operatably coupled with the first coupling mechanism 2712-2714. Further, the first toggle mechanism 2718 may be transitionable between a locked state and an unlocked state. Further, the first toggle mechanism 2718 allows pivoting of the middle plate 2704 in the unlocked state and restricts the pivoting of the middle plate 2704 in the locked state.

Further, in an embodiment, the at least one actuating device 2710 may be operatably coupled with the first toggle mechanism 2718. Further, the at least one actuating device 2710 may be configured for transitioning the first toggle mechanism 2718 from the locked state to the unlocked state based on the receiving of the first actuating input. Further, the at least one actuating device 2710 may be configured for transitioning the first toggle mechanism 2718 from the unlocked state to the locked state based on the receiving of the second actuating input.

In further embodiments, the adjustable stand 2700 may include at least one clamp assembly 2722 and 2902 (shown in FIG. 29) mounted on a top surface 2724 of the bottom plate 2702. Further, the at least one clamp assembly 2722 and 2902 may include a clamp arm 2726 and 2728. Further, the clamp arm 2726 and 2728 may be configured to be wrapped around at least one leg (legs 70-71) of a user (user 72) for holding the bottom plate 2702 to the at least one leg of the user. Further, the clamp arm 2726 and 2728 may be comprised of deformable material to allow the clamp arm 2726 and 2728 to be easily wrapped around the at least one leg.

Further, in an embodiment, a bottom surface 2744 of the bottom plate 2702 may include a non-slip surface. Further, the non-slip surface prevents the bottom plate 2702 from sliding off the at least one leg of the user after the holding of the bottom plate 2702 to the at least one leg. Further, the non-slip surface may be a coating of at least one coarse and rough textured material. Further, the non-slip surface may be a coating of at least one adhesive material. Further, the at least one adhesive material attaches the bottom surface 2744 of the bottom plate 2702 to the at least one leg of the user.

In further embodiments, the adjustable stand 2700 may include at least one page support assembly 2730-2732 mounted on the bottom surface 2716 of the top plate 2706. Further, the at least one page support assembly 2730-2732 may include a support arm 2734 and 2736. Further, the support arm 2734 and 2736 may be configured to be placed on a top surface 2904 of the top plate 2706 for holding at least one object 2738 to the top surface 2904 of the top plate 2706. Further, at least one object 2738 may include a book, a laptop, etc.

Further, in an embodiment, the top surface 2904 of the top plate 2706 may include a non-slip surface. Further, the non-slip surface prevents the at least one object 2738 from sliding off the top surface 2904 of the top plate 2706 after the holding of the at least one object 2738 to the top surface 2904 of the top plate 2706.

In further embodiments, the adjustable stand 2700 may include a strap (strap 41) attached to the bottom plate 2702. Further, the strap may be configured to be worn around a neck (neck 73) of a user for holding the bottom plate 2702 to a chest (chest 74) of the user.

Figure 30:
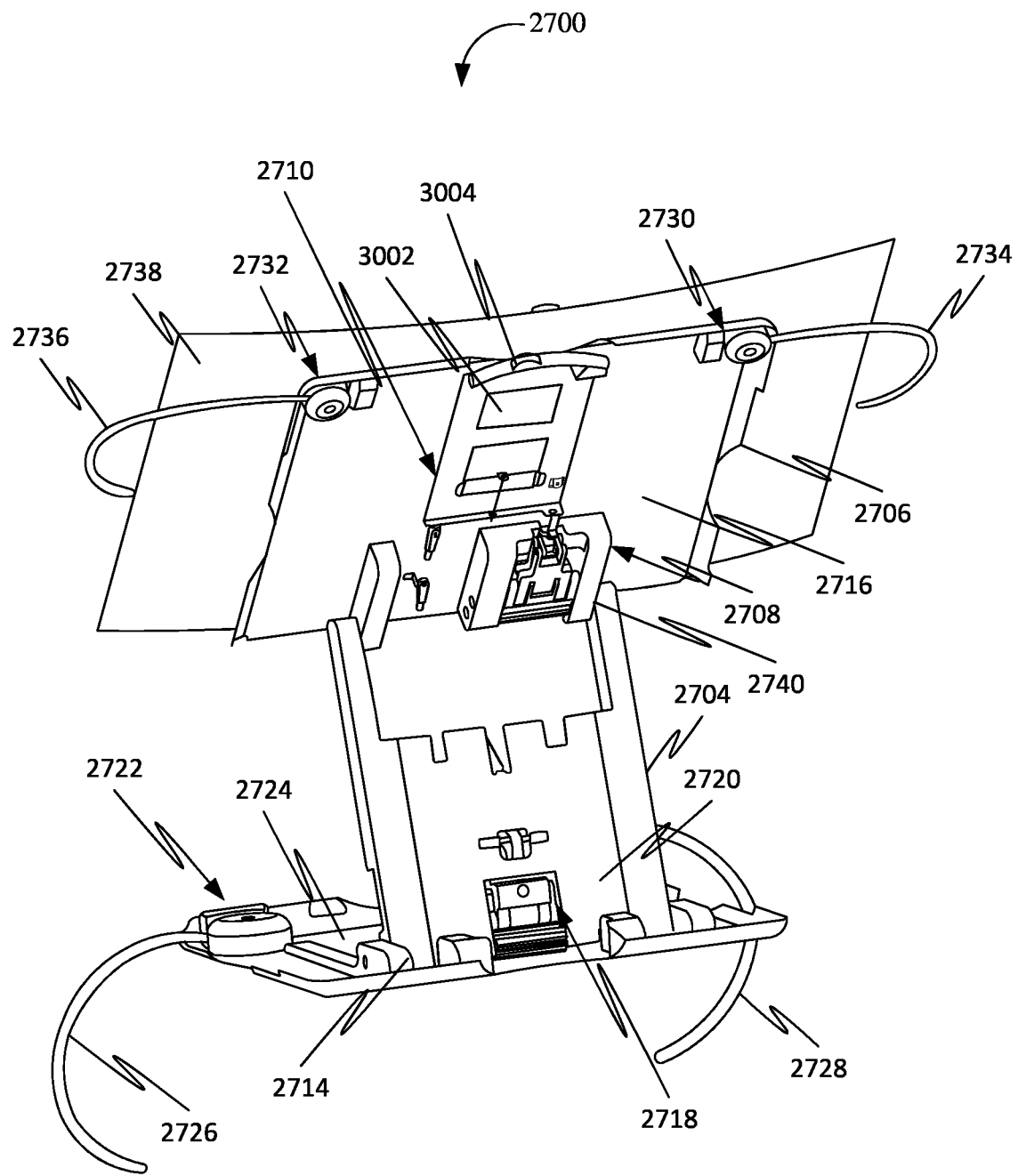
FIG. 30 is a rear perspective view of the adjustable stand, in accordance with some embodiments.

Further, in some embodiments, the at least one actuating device 2710 may include an electrically actuated solenoid 3002, as shown in FIG. 30. Further, the receiving of the first actuating input may include receiving a first actuating action from at least one input device 3004, as shown in FIG. 30, coupled to the electrically actuated solenoid 3002. Further, the receiving of the second actuating input may include receiving a second actuating action from the at least one input device 3004. Further, the at least one input device may be a button. Further, the first actuating action may include a first button push and the second actuating action may include a second button push.

Further, in some embodiments, the middle plate 2704 may be rotatably coupled to the bottom plate 2702 using the first coupling mechanism 2712-2714. Further, the middle plate 2704 may be configured to be rotated in relation to the bottom plate 2702 between a plurality of rotatable positions about a first rotating axis of the first coupling mechanism 2712-2714 using the first coupling mechanism 2712-2714. Further, the first rotating axis may be perpendicular to the first pivoting axis.

Further, in some embodiments, the top plate 2706 may be rotatably coupled to the middle plate 2704 using the second coupling mechanism 2740-2742. Further, the top plate 2706 may be configured to be rotated in relation to the middle plate 2704 between a plurality of first rotatable positions about a second rotating axis of the second coupling mechanism 2740-2742 using the second coupling mechanism 2740-2742. Further, the second rotating axis may be perpendicular to the second pivoting axis.

FIG. 28 is a rear perspective view of the adjustable stand 2700, in accordance with some embodiments.

Figure 29:
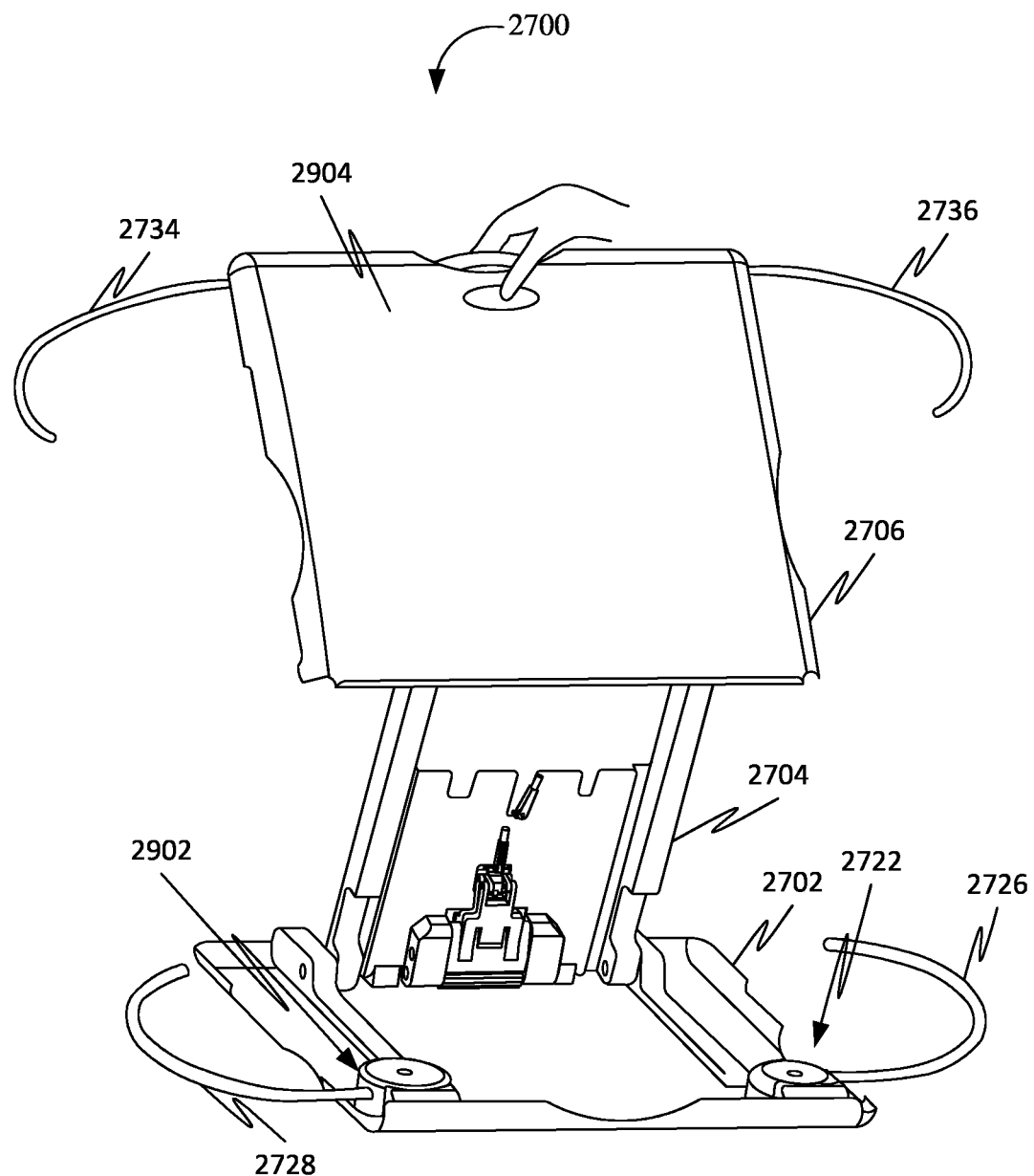
FIG. 29 is a front perspective view of the adjustable stand, in accordance with some embodiments.

FIG. 29 is a front perspective view of the adjustable stand 2700, in accordance with some embodiments.

FIG. 30 is a rear perspective view of the adjustable stand 2700, in accordance with some embodiments.

Figure 31:
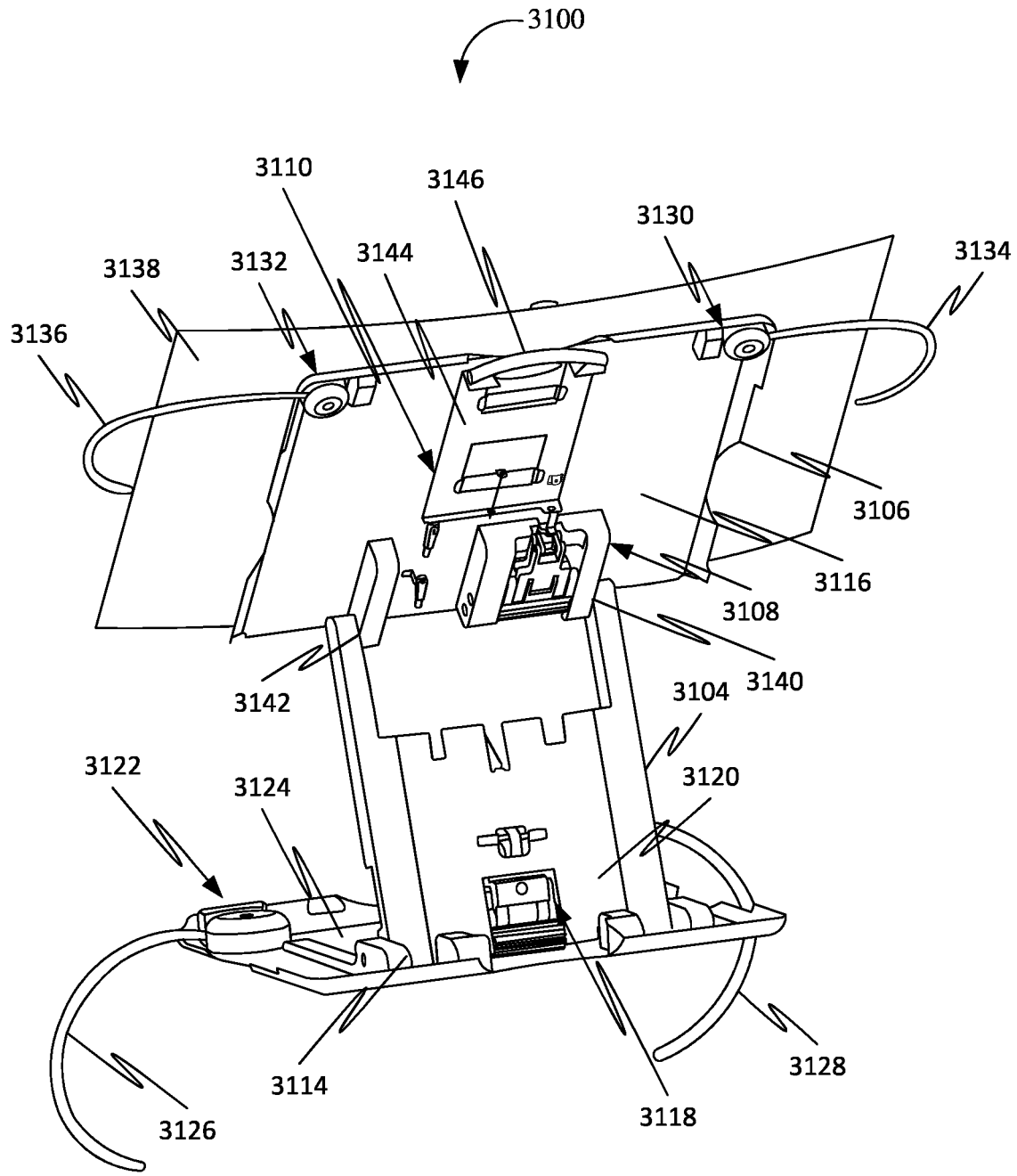
FIG. 31 is a rear perspective view of an adjustable stand for supporting objects on the adjustable stand, in accordance with some embodiments.

FIG. 31 is a rear perspective view of an adjustable stand 3100 for supporting objects on the adjustable stand 3100, in accordance with some embodiments. Accordingly, the adjustable stand 3100 may include a bottom plate 3102, a middle plate 3104, a top plate 3106, a toggle mechanism 3108, and at least one actuating device 3110.

Further, the middle plate 3104 may be pivotably coupled to the bottom plate 3102 using a first coupling mechanism 3112-3114. Further, the middle plate 3104 pivots between a closed position and at least one open position in relation to the bottom plate 3102 about a first pivoting axis of the first coupling mechanism 3112-3114 using the first coupling mechanism 3112-3114 for adjusting a height of the adjustable stand 3100.

Further, the top plate 3106 may be pivotably coupled to the middle plate 3104 using a second coupling mechanism 3140-3142. Further, the top plate 3106 pivots between a plurality of positions in relation to the middle plate 3104 about a second pivoting axis of the second coupling mechanism 3140-3142 using the second coupling mechanism 3140-3142 for adjusting an orientation of the top plate 3106 in relation to the middle plate 3104.

Further, the toggle mechanism 3108 may be mounted on a bottom surface 3116 of the top plate 3106. Further, the toggle mechanism 3108 may be operatably coupled with the second coupling mechanism 3140-3142. Further, the toggle mechanism 3108 may be transitionable between a locked state and an unlocked state. Further, the toggle mechanism 3108 allows pivoting of the top plate 3106 in the unlocked state and restricts the pivoting of the top plate 3106 in the locked state. Further, the at least one actuating device 3110 may be operatably coupled with the toggle mechanism 3108.

Further, the at least one actuating device 3110 may be configured for transitioning the toggle mechanism 3108 from the locked state to the unlocked state based on the receiving of a first actuating input. Further, the at least one actuating device 3110 may be configured for transitioning the toggle mechanism 3108 from the unlocked state to the locked state based on the receiving of a second actuating input. Further, the at least one actuating device 3110 may include a latch mechanism 3144 mounted on the bottom surface 3116 of the top plate 3106. Further, the latch mechanism 3144 may be operatably coupled with the toggle mechanism 3108. Further, the receiving of the first actuating input may include applying a pull force on a handle 3146 of the latch mechanism 3144. Further, the receiving of the second actuating input may include releasing the pull force applied to the handle 3146. Further, the toggle mechanism 3108 may be configured for transitioning to the unlocked state from the locked state based on applying a pivoting force on the top plate 3106 above a threshold pivoting force without the receiving of the first actuating input. Further, the toggle mechanism 3108 may be configured for transitioning to the locked state from the unlocked state based on releasing the pivoting force applied to the top plate 3106.

Further, in some embodiments, the transitioning to the unlocked state from the locked state may include transitioning to the unlocked state from the locked state based on the applying of the pivoting force on the top plate 3106 above the threshold pivoting force without the applying of the pull force on the handle 3146.

In further embodiments, the adjustable stand 3100 may include a first toggle mechanism 3118 mounted on a top surface 3120 of the middle plate 3104. Further, the first toggle mechanism 3118 may be operatably coupled with the first coupling mechanism 3112-3114. Further, the first toggle mechanism 3118 may be transitionable between a locked state and an unlocked state. Further, the first toggle mechanism 3118 allows pivoting of the middle plate 3104 in the unlocked state and restricts the pivoting of the middle plate 3104 in the locked state.

Further, in an embodiment, the at least one actuating device 3110 may be operatably coupled with the first toggle mechanism 3118. Further, the at least one actuating device 3110 may be configured for transitioning the first toggle mechanism 3118 from the locked state to the unlocked state based on the receiving of the first actuating input. Further, the at least one actuating device 3110 may be configured for transitioning the first toggle mechanism 3118 from the unlocked state to the locked state based on the receiving of the second actuating input.

In further embodiments, the adjustable stand 3100 may include at least one clamp assembly 3122 and 3202 mounted on a top surface 3124 of the bottom plate 3102. Further, the at least one clamp assembly 3122 and 3202 may include a clamp arm 3126 and 3128. Further, the clamp arm 3126 and 3128 may be configured to be wrapped around at least one leg of a user for holding the bottom plate 3102 to the at least one leg of the user.

In further embodiments, the adjustable stand 3100 may include at least one page support assembly 3130-3132 mounted on the bottom surface 3116 of the top plate 3106. Further, the at least one page support assembly 3130-3132 may include a support arm 3134 and 3136. Further, the support arm 3134 and 3136 may be configured to be placed on a top surface 3204 of the top plate 3106 for holding at least one object 3138 to the top surface 3204 of the top plate 3106.

Figure 32:
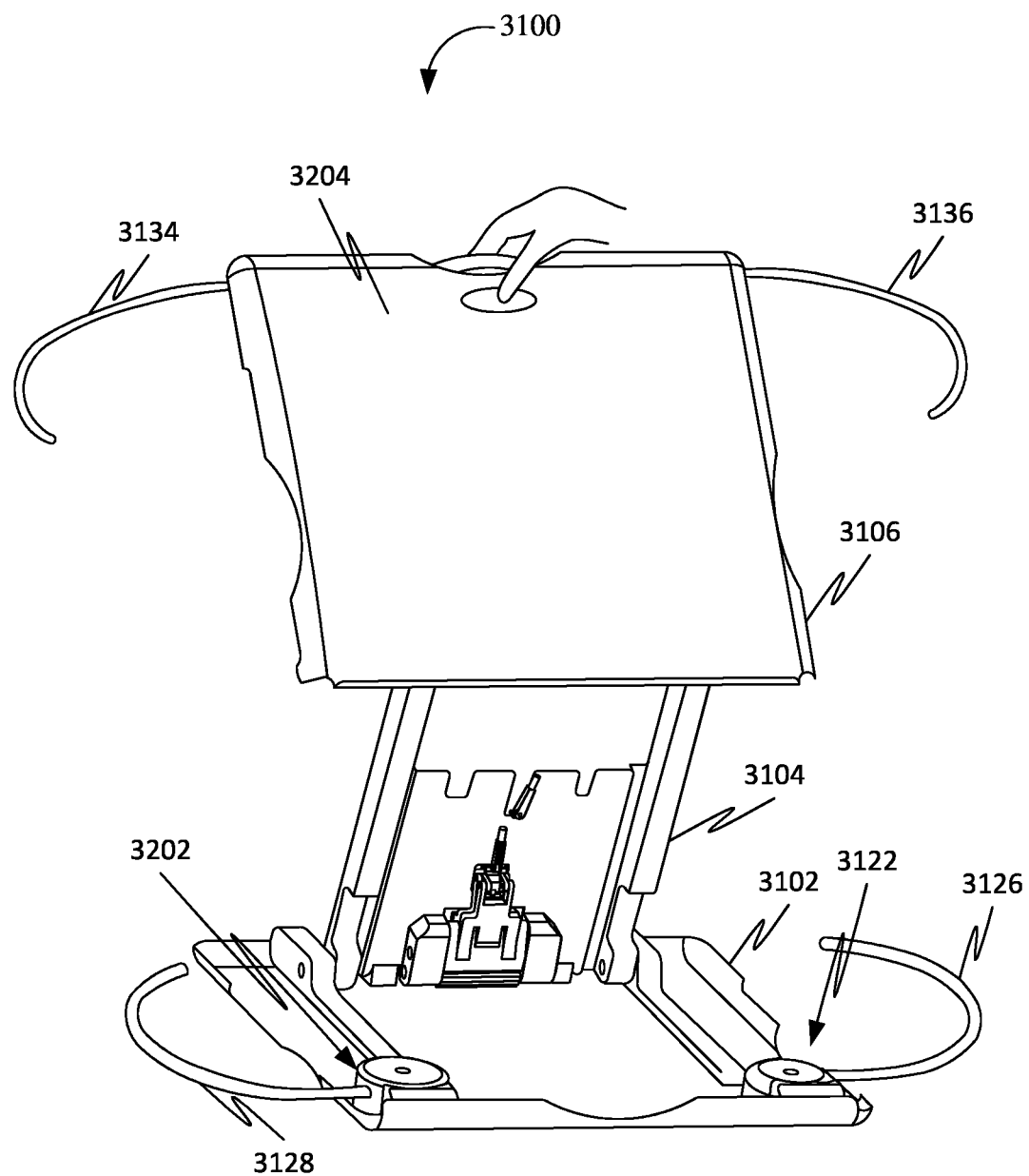
FIG. 32 is a front perspective view of the adjustable stand, in accordance with some embodiments.

FIG. 32 is a front perspective view of the adjustable stand 3100, in accordance with some embodiments.

Figure 33:
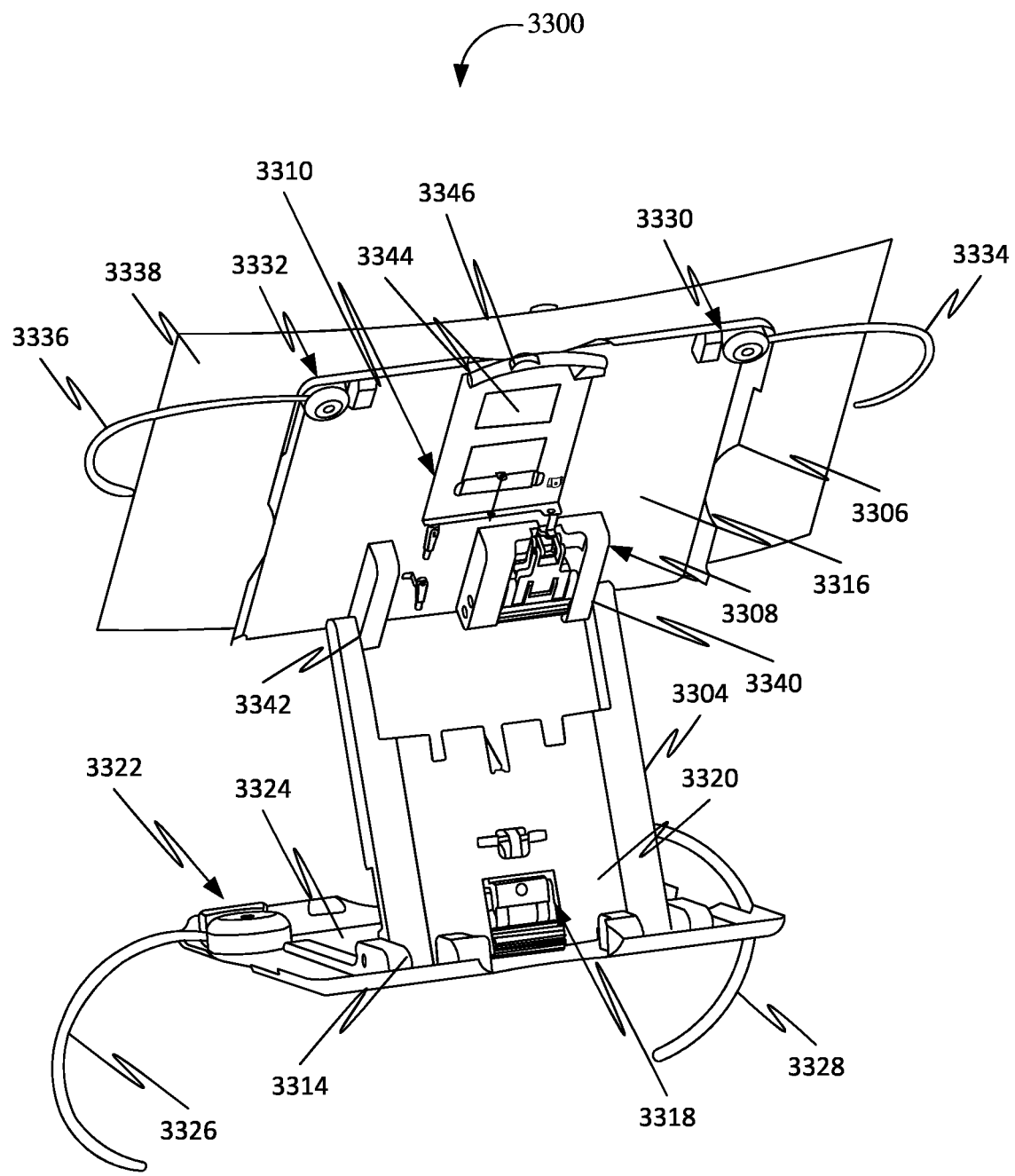
FIG. 33 is a rear perspective view of an adjustable stand for supporting objects on the adjustable stand, in accordance with some embodiments.

FIG. 33 is a rear perspective view of an adjustable stand 3300 for supporting objects on the adjustable stand 3300, in accordance with some embodiments. Accordingly, the adjustable stand 3300 may include a bottom plate 3302, a middle plate 3304, a top plate 3306, a toggle mechanism 3308, and at least one actuating device 3310.

Further, the middle plate 3304 may be pivotably coupled to the bottom plate 3302 using a first coupling mechanism 3312-3314. Further, the middle plate 3304 pivots between a closed position and at least one open position in relation to the bottom plate 3302 about a first pivoting axis of the first coupling mechanism 3312-3314 using the first coupling mechanism 3312-3314 for adjusting a height of the adjustable stand 3300.

Further, the top plate 3306 may be pivotably coupled to the middle plate 3304 using a second coupling mechanism 3340-3342. Further, the top plate 3306 pivots between a plurality of positions in relation to the middle plate 3304 about a second pivoting axis of the second coupling mechanism 3340-3342 using the second coupling mechanism 3340-3342 for adjusting an orientation of the top plate 3306 in relation to the middle plate 3304.

Further, the toggle mechanism 3308 may be mounted on a bottom surface 3316 of the top plate 3306. Further, the toggle mechanism 3308 may be operably coupled with the second coupling mechanism 3340-3342. Further, the toggle mechanism 3308 may be transitionable between a locked state and an unlocked state. Further, the toggle mechanism 3308 allows pivoting of the top plate 3306 in the unlocked state and restricts the pivoting of the top plate 3306 in the locked state. Further, the at least one actuating device 3310 may be operably coupled with the toggle mechanism 3308.

Further, the at least one actuating device 3310 may be configured for transitioning the toggle mechanism 3308 from the locked state to the unlocked state based on the receiving of a first actuating input. Further, the at least one actuating device 3310 may be configured for transitioning the toggle mechanism 3308 from the unlocked state to the locked state based on the receiving of a second actuating input. Further, the at least one actuating device 3310 may include an electrically actuated solenoid 3344. Further, the receiving of the first actuating input may include receiving a first actuating action from at least one input device 3346 coupled to the electrically actuated solenoid 3344. Further, the receiving of the second actuating input may include receiving a second actuating action from the at least one input device 3346. Further, the toggle mechanism 3308 may be configured for transitioning to the unlocked state from the locked state based on applying a pivoting force on the top plate 3306 above a threshold pivoting force without the receiving of the first actuating input. Further, the toggle mechanism 3308 may be configured for transitioning to the locked state from the unlocked state based on releasing the pivoting force applied to the top plate 3306.

Although the present disclosure has been explained in relation to its preferred embodiment, it is to be understood that many other possible modifications and variations can be made without departing from the spirit and scope of the disclosure.

What is claimed is:

1. An adjustable stand for supporting objects on the adjustable stand, the adjustable stand comprising:
   a bottom plate;
   a middle plate pivotably coupled to the bottom plate using a first coupling mechanism, wherein the middle plate pivots between a closed position and at least one open position in relation to the bottom plate about a first pivoting axis of the first coupling mechanism, using the first coupling mechanism for adjusting a height of the adjustable stand;
   a top plate pivotably coupled to the middle plate using a second coupling mechanism, wherein the top plate pivots between a plurality of positions in relation to the middle plate about a second pivoting axis of the second coupling mechanism using the second coupling mechanism for adjusting an orientation of the top plate in relation to the middle plate;
   a toggle mechanism mounted on a bottom surface of the top plate, wherein the toggle mechanism is operably coupled with the second coupling mechanism, wherein the toggle mechanism is transitionable between a locked state and an unlocked state, wherein the toggle mechanism allows pivoting of the top plate in the unlocked state and restricts the pivoting of the top plate in the locked state; and
   at least one actuating device operably coupled with the toggle mechanism, wherein the at least one actuating device is configured for:
      transitioning the toggle mechanism from the locked state to the unlocked state based on the receiving of a first actuating input; and
      transitioning the toggle mechanism from the unlocked state to the locked state based on the receiving of a second actuating input, wherein the toggle mechanism is configured for transitioning to the unlocked state from the locked state based on applying a pivoting force on the top plate above a threshold pivoting force without the receiving of the first actuating input, wherein the toggle mechanism is configured for transitioning to the locked state from the unlocked state based on releasing the pivoting force applied to the top plate.

2. The adjustable stand of claim 1, wherein the at least one actuating device comprises a latch mechanism mounted on the bottom surface of the top plate, wherein the latch mechanism is operably coupled with the toggle mechanism, wherein the receiving of the first actuating input comprises applying a pull force on a handle of the latch mechanism, wherein the receiving of the second actuating input comprises releasing the pull force applied to the handle.

3. The adjustable stand of claim 2, wherein the transitioning to the unlocked state from the locked state comprises transitioning to the unlocked state from the locked state based on the applying of the pivoting force on the top plate above the threshold pivoting force without the applying of the pull force on the handle.

4. The adjustable stand of claim 1 further comprising a first toggle mechanism mounted on a top surface of the middle plate, wherein the first toggle mechanism is operably coupled with the first coupling mechanism, wherein the first toggle mechanism is transitionable between a locked state and an unlocked state, wherein the first toggle mechanism allows pivoting of the middle plate in the unlocked state and restricts the pivoting of the middle plate in the locked state.

5. The adjustable stand of claim 4, wherein the at least one actuating device is operatably coupled with the first toggle mechanism, wherein the at least one actuating device is further configured for:
transitioning the first toggle mechanism from the locked state to the unlocked state based on the receiving of the first actuating input; and
transitioning the first toggle mechanism from the unlocked state to the locked state based on the receiving of the second actuating input.

6. The adjustable stand of claim 1 further comprising at least one clamp assembly mounted on a top surface of the bottom plate, wherein the at least one clamp assembly comprises a clamp arm, wherein the clamp arm is configured to be wrapped around at least one leg of a user for holding the bottom plate to the at least one leg of the user.

7. The adjustable stand of claim 6, wherein a bottom surface of the bottom plate comprises a non-slip surface, wherein the non-slip surface prevents the bottom plate from sliding off the at least one leg of the user after the holding of the bottom plate to the at least one leg.

8. The adjustable stand of claim 1 further comprising at least one page support assembly mounted on the bottom surface of the top plate, wherein the at least one page support assembly comprises a support arm, wherein the support arm is configured to be placed on a top surface of the top plate for holding at least one object to the top surface of the top plate.

9. The adjustable stand of claim 8, wherein the top surface of the top plate comprises a non-slip surface, wherein the non-slip surface prevents the at least one object from sliding off the top surface of the top plate after the holding of the at least one object to the top surface of the top plate.

10. The adjustable stand of claim 1 further comprising a strap attached to the bottom plate, wherein the strap is configured to be worn around a neck of a user for holding the bottom plate to a chest of the user.

11. The adjustable stand of claim 1, wherein the at least one actuating device comprises an electrically actuated solenoid, wherein the receiving of the first actuating input comprises receiving a first actuating action from at least one input device coupled to the electrically actuated solenoid, wherein the receiving of the second actuating input comprises receiving a second actuating action from the at least one input device.

12. The adjustable stand of claim 1, wherein the middle plate is rotatably coupled to the bottom plate using the first coupling mechanism, wherein the middle plate is configured to be rotated in relation to the bottom plate between a plurality of rotatable positions about a first rotating axis of the first coupling mechanism using the first coupling mechanism, wherein the first rotating axis is perpendicular to the first pivoting axis.

13. The adjustable stand of claim 1, wherein the top plate is rotatably coupled to the middle plate using the second coupling mechanism, wherein the top plate is configured to be rotated in relation to the middle plate between a plurality of first rotatable positions about a second rotating axis of the second coupling mechanism using the second coupling mechanism, wherein the second rotating axis is perpendicular to the second pivoting axis.

14. An adjustable stand for supporting objects on the adjustable stand, the adjustable stand comprising:
a bottom plate;
a middle plate pivotably coupled to the bottom plate using a first coupling mechanism, wherein the middle plate pivots between a closed position and at least one open position in relation to the bottom plate about a first pivoting axis of the first coupling mechanism, using the first coupling mechanism for adjusting a height of the adjustable stand;
a top plate pivotably coupled to the middle plate using a second coupling mechanism, wherein the top plate pivots between a plurality of positions in relation to the middle plate about a second pivoting axis of the second coupling mechanism using the second coupling mechanism for adjusting an orientation of the top plate in relation to the middle plate;
a toggle mechanism mounted on a bottom surface of the top plate, wherein the toggle mechanism is operatably coupled with the second coupling mechanism, wherein the toggle mechanism is transitionable between a locked state and an unlocked state, wherein the toggle mechanism allows pivoting of the top plate in the unlocked state and restricts the pivoting of the top plate in the locked state; and
at least one actuating device operatably coupled with the toggle mechanism, wherein the at least one actuating device is configured for:
receiving at least one actuating input;
transitioning the toggle mechanism from the locked state to the unlocked state based on the receiving of a first actuating input; and
transitioning the toggle mechanism from the unlocked state to the locked state based on the receiving of a second actuating input, wherein the at least one actuating device comprises a latch mechanism mounted on the bottom surface of the top plate, wherein the latch mechanism is operatably coupled with the toggle mechanism, wherein the receiving of the first actuating input comprises applying a pull force on a handle of the latch mechanism, wherein the receiving of the second actuating input comprises releasing the pull force applied to the handle, wherein the toggle mechanism is configured for transitioning to the unlocked state from the locked state based on applying a pivoting force on the top plate above a threshold pivoting force without the receiving of the first actuating input, wherein the toggle mechanism is configured for transitioning to the locked state from the unlocked state based on releasing the pivoting force applied to the top plate.

15. The adjustable stand of claim 14, wherein the transitioning to the unlocked state from the locked state comprises transitioning to the unlocked state from the locked state based on the applying of the pivoting force on the top plate above the threshold pivoting force without the applying of the pull force on the handle.

16. The adjustable stand of claim 14 further comprising a first toggle mechanism mounted on a top surface of the middle plate, wherein the first toggle mechanism is operatably coupled with the first coupling mechanism, wherein the first toggle mechanism is transitionable between a locked state and an unlocked state, wherein the first toggle mechanism allows pivoting of the middle plate in the unlocked state and restricts the pivoting of the middle plate in the locked state.

17. The adjustable stand of claim 16, wherein the at least one actuating device is operatably coupled with the first toggle mechanism, wherein the at least one actuating device is further configured for:

transitioning the first toggle mechanism from the locked state to the unlocked state based on the receiving of the first actuating input; and transitioning the first toggle mechanism from the unlocked state to the locked state based on the receiving of the second actuating input.

18. The adjustable stand of claim 14 further comprising at least one clamp assembly mounted on a top surface of the bottom plate, wherein the at least one clamp assembly comprises a clamp arm, wherein the clamp arm is configured to be wrapped around at least one leg of a user for holding the bottom plate to the at least one leg of the user.

19. The adjustable stand of claim 14 further comprising at least one page support assembly mounted on the bottom surface of the top plate, wherein the at least one page support assembly comprises a support arm, wherein the support arm is configured to be placed on a top surface of the top plate for holding at least one object to the top surface of the top plate.

* * * * *